United States Patent
Saxena et al.

(10) Patent No.: US 9,766,693 B2
(45) Date of Patent: Sep. 19, 2017

(54) SCHEDULING FRAMEWORK FOR VIRTUAL MACHINE POWER MODES

(71) Applicant: INTERNATIONAL BUSINESS MACHINES CORPORATION, Armonk, NY (US)

(72) Inventors: Rajesh K. Saxena, Maharashta (IN); Pranshu Tiwari, New Delhi (IN); Vikram Yadav, Ghazaibad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/990,429

(22) Filed: Jan. 7, 2016

(65) Prior Publication Data
US 2017/0199564 A1    Jul. 13, 2017

(51) Int. Cl.
- *G06F 1/12* (2006.01)
- *G06F 1/32* (2006.01)
- *G06F 9/455* (2006.01)
- *G06F 1/14* (2006.01)

(52) U.S. Cl.
CPC ........ *G06F 1/3296* (2013.01); *G06F 9/45558* (2013.01); *G06F 1/14* (2013.01); *G06F 2009/45575* (2013.01)

(58) Field of Classification Search
CPC ........................................................ G06F 1/00
USPC ........................................................ 713/400
See application file for complete search history.

(56) References Cited

U.S. PATENT DOCUMENTS

| | | | |
|---|---|---|---|
| 2006/0259621 A1* | 11/2006 | Ranganathan | G06F 1/206 709/226 |
| 2009/0240964 A1* | 9/2009 | Pfeiffer | G06F 1/3209 713/320 |
| 2009/0293022 A1* | 11/2009 | Fries | G06F 1/206 716/132 |

(Continued)

OTHER PUBLICATIONS

Yadav et al., "Energy Efficient Virtual Machine Optimization", International Journal of Computer Applications, vol. 106, No. 7, Nov. 2014, pp. 23-28.

(Continued)

*Primary Examiner* — Jaweed A Abbaszadeh
*Assistant Examiner* — Volvick Derose
(74) *Attorney, Agent, or Firm* — Ronald A. Kashchak; Matthew M. Hulihan; Heslin, Rothenberg Farley & Mesiti P.C.

(57) ABSTRACT

Provision of power scheduling framework for a plurality of virtual machines to facilitate energy savings in handing service instances includes configuring a first set of virtual machines in an active power mode and a second set of virtual machines in one or more other power modes, and managing, across a time period and based on service instance arrival, power mode configuration for the first set of virtual machines and the second set of virtual machines, the managing including initiating one or more transitions of at least one virtual machine between power modes of the plurality of power modes, wherein a transition energy cost is associated with transitioning from a lower power mode of the plurality of power modes to a higher power mode of the plurality of power modes, and wherein the managing accounts for transition energy cost in determining the one or more transitions.

20 Claims, 13 Drawing Sheets

(56) References Cited

U.S. PATENT DOCUMENTS

| | | | | |
|---|---|---|---|---|
| 2010/0115509 A1* | 5/2010 | Kern | G06F 1/3203 | 718/1 |
| 2010/0180275 A1* | 7/2010 | Neogi | G06F 1/3203 | 718/1 |
| 2010/0218005 A1* | 8/2010 | Jain | G06F 9/5094 | 713/300 |
| 2010/0218014 A1* | 8/2010 | Bozek | G06F 1/3209 | 713/320 |
| 2011/0107126 A1* | 5/2011 | Goodrum | G06F 1/3203 | 713/320 |
| 2011/0239010 A1* | 9/2011 | Jain | G06F 1/3209 | 713/310 |
| 2012/0005683 A1* | 1/2012 | Bower, III | G06F 9/5094 | 718/103 |
| 2012/0042312 A1* | 2/2012 | Isci | G06F 1/3203 | 718/1 |
| 2012/0053925 A1* | 3/2012 | Geffin | G06F 1/3206 | 703/21 |
| 2012/0124402 A1* | 5/2012 | Vanderwiel | G06F 1/3206 | 713/320 |
| 2013/0339759 A1* | 12/2013 | Doddavula | G06F 1/3206 | 713/300 |
| 2015/0006940 A1* | 1/2015 | Kim | G06F 1/26 | 713/340 |
| 2016/0103711 A1* | 4/2016 | Gaurav | G06F 9/4893 | 718/102 |

OTHER PUBLICATIONS

Roy et al., "Virtual Machine Scheduling on Clouds Using DVFS", International Journal of Advanced Research in Computer Science and Software Engineering, vol. 5, Issue 5, May 2015, pp. 405-410.

Mazzucco et al., "Balancing Electricity Bill and Performance in Server Farms With Setup Costs", Elsevier, , 2011, pp. 1-12.

"System and Method to Intelligently Offer Application Alternatives Based on Watt Calculation", Mar. 15, 2011, pp. 1-7.

Mastroianni et al., "Analysis of a Self-Organizing Algorithm for Energy Saving in Data Centers", 2013 IEEE 27th International Symposium on Parallel & Distributed Processing Workshops and PhD Forum, pp. 907-914.

* cited by examiner

| Assigning Energy levels | Inactive | Idle | Power nap | Active | DVFS gradient | DVFS maximum |
|---|---|---|---|---|---|---|
| Inactive | | | | | | |
| Idle | | $E_{(\phi,i)} = EX$ | | | | |
| Power nap | | $E_{(\phi,pn)} = 2EX$ | $E_{(i,pn)} = EX$ | | | |
| Active | | $E_{(\phi,x)} = 3EX$ | $E_{(i,x)} = 2EX$ | $E_{(pn,x)} = EX$ | | |
| DVFS gradient | | | | | $E_{(\phi,dvfs)} = EX$ | |
| DVFS maximum | | | | | $E_{(x,max)} = EX$ | $E_{(dvfs,max)} = 2EX$ |

SCHEDULING FRAMEWORK FOR VIRTUAL MACHINE POWER MODES

BACKGROUND

A datacenter/cloud facility typically contains thousands of servers that demand large amounts of power for both server operation and cooling, leading to high operating cost and hidden cost associated with the facility's carbon footprint. Cloud providers are faced with a challenging problem of running energy-efficient data centers. Meanwhile, the workload experienced by the servers varies through the day. If the servers are on all of the time, the utilization would be dramatically low during period of less active workload because datacenter capacity is usually provisioned for peak rather than average load.

SUMMARY

Shortcomings of the prior art are overcome and additional advantages are provided through the provision of a computer-implemented method that includes providing a power scheduling framework for a plurality of virtual machines to facilitate energy savings in handing service instances, and the providing comprising: obtaining an indication of an initial number of virtual machines, of the plurality of virtual machines, to configure in an active power mode to handle the service instances, the active power mode being one power mode of a plurality of power modes in which the plurality of virtual machines are available for configuration; configuring a first set of virtual machines, of the plurality of virtual machines, in the active power mode, the first set of virtual machines comprising the indicated number of virtual machines; configuring a second set of virtual machines, of the plurality of virtual machines, in one or more other power modes, of the plurality of power modes, lower than the active power mode; and managing, across a time period and based on service instance arrival, power mode configuration for the first set of virtual machines configured in the active power mode and the second set of virtual machines configured in the one or more other powers modes, the managing comprising initiating one or more transitions of at least one virtual machine between power modes of the plurality of power modes, wherein a transition energy cost is associated with transitioning from a lower power mode of the plurality of power modes to a higher power mode of the plurality of power modes, and wherein the managing accounts for transition energy cost in determining the one or more transitions.

Further, a computer system is provided that includes a memory and a processor in communications with the memory, wherein the computer system is configured to perform a method including providing a power scheduling framework for a plurality of virtual machines to facilitate energy savings in handing service instances, and the providing comprising: obtaining an indication of an initial number of virtual machines, of the plurality of virtual machines, to configure in an active power mode to handle the service instances, the active power mode being one power mode of a plurality of power modes in which the plurality of virtual machines are available for configuration; configuring a first set of virtual machines, of the plurality of virtual machines, in the active power mode, the first set of virtual machines comprising the indicated number of virtual machines; configuring a second set of virtual machines, of the plurality of virtual machines, in one or more other power modes, of the plurality of power modes, lower than the active power mode; and managing, across a time period and based on service instance arrival, power mode configuration for the first set of virtual machines configured in the active power mode and the second set of virtual machines configured in the one or more other powers modes, the managing comprising initiating one or more transitions of at least one virtual machine between power modes of the plurality of power modes, wherein a transition energy cost is associated with transitioning from a lower power mode of the plurality of power modes to a higher power mode of the plurality of power modes, and wherein the managing accounts for transition energy cost in determining the one or more transitions.

Yet further, a computer program product including a computer readable storage medium readable by a processor and storing instructions for execution by the processor is provided for performing a method that includes providing a power scheduling framework for a plurality of virtual machines to facilitate energy savings in handing service instances, and the providing comprising: obtaining an indication of an initial number of virtual machines, of the plurality of virtual machines, to configure in an active power mode to handle the service instances, the active power mode being one power mode of a plurality of power modes in which the plurality of virtual machines are available for configuration; configuring a first set of virtual machines, of the plurality of virtual machines, in the active power mode, the first set of virtual machines comprising the indicated number of virtual machines; configuring a second set of virtual machines, of the plurality of virtual machines, in one or more other power modes, of the plurality of power modes, lower than the active power mode; and managing, across a time period and based on service instance arrival, power mode configuration for the first set of virtual machines configured in the active power mode and the second set of virtual machines configured in the one or more other powers modes, the managing comprising initiating one or more transitions of at least one virtual machine between power modes of the plurality of power modes, wherein a transition energy cost is associated with transitioning from a lower power mode of the plurality of power modes to a higher power mode of the plurality of power modes, and wherein the managing accounts for transition energy cost in determining the one or more transitions.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7 depicts a table of example switching energy costs in moving from a power mode to another power mode, in accordance with aspects described herein;

FIG. 8 depicts a table of example residual energy with transitions between power modes, in accordance with aspects described herein;

DETAILED DESCRIPTION

Figure 1:
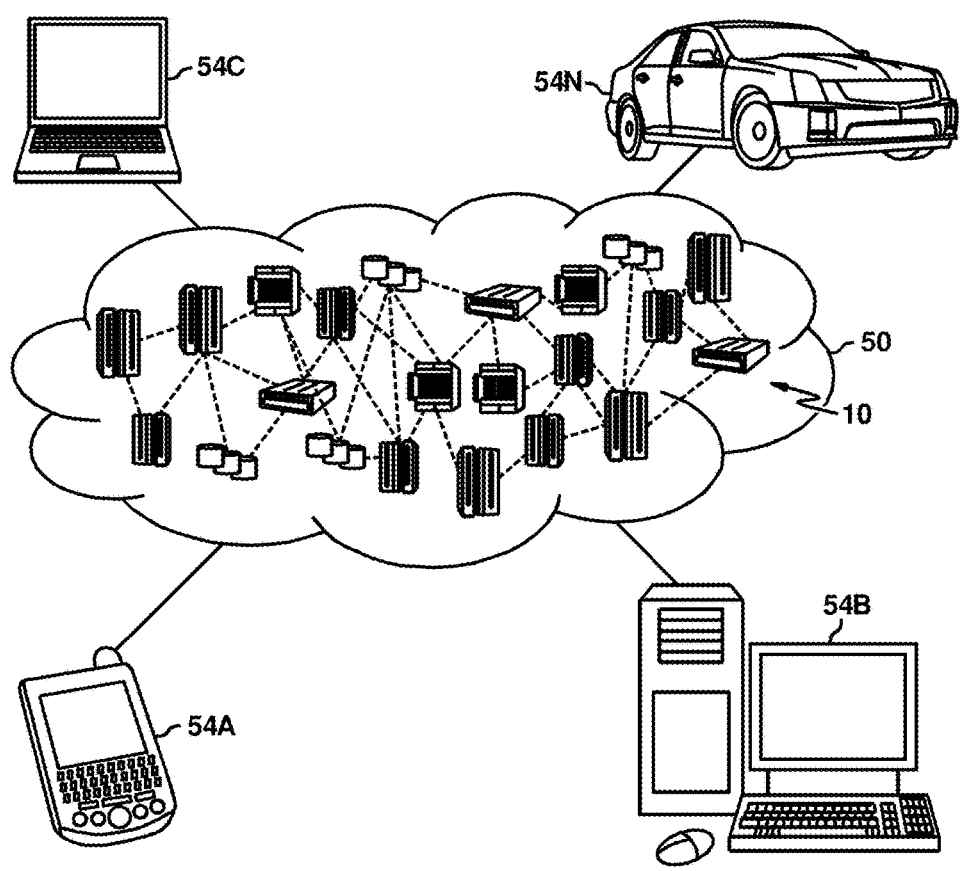
FIG. 1 depicts a cloud computing environment in accordance with aspects described herein.

Aspects described herein provide a scheduling framework utilizing different power modes of virtual machines and adjusting a number of servers for a current workload, such that quality of service is not adversely impacted but energy costs are reduced. Accordingly, aspects described herein are presented in a context of cloud computing environments by way of example.

It is understood in advance that although aspects of this disclosure include descriptions of cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Example characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out, and can also be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Example Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Example Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, mobile device 54A (personal digital assistant, cellular telephone, tablet, etc.), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
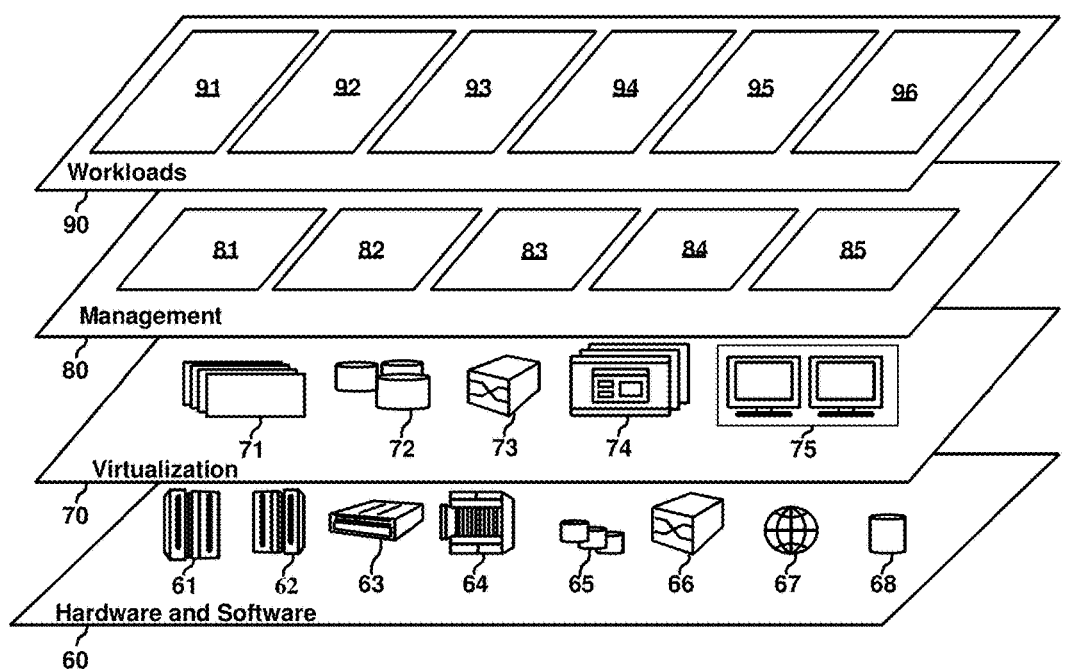
FIG. 2 depicts abstraction model layers in accordance with aspects described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and customer application execution 96.

Virtual servers/virtual machines (VMs) (e.g. 71 of virtualization layer 70) provide processing resources for handling workloads. Described herein are aspects of power mode switching, including dynamic voltage and frequency scaling (DVFS) with considerations for transition energy costs in switching VMs between different server power modes. Example power modes/states include active, powernap, sleep/idle, inactive, and DVFS mode (which may include partial/gradient or maximum/full DVFS). Power mode switching refers to strategically moving VMs through different power modes to, e.g., minimize energy costs while maintaining a service level agreement (SLA).

Aspects described herein reduce energy consumption through provision of a cohesive scheduling framework (considering an online model and offline legacy data model, described below) that can achieve the following, as examples:

i. Optimize a number of VMs operative in best fit modes (active, DVFS (partial or maximum), powernap, idle, inactive);

ii. Actively reduce the number of idling VM instances; and iii. Minimize transient energy losses.

Thus, provided herein is a scheduling framework to provide an energy-efficient virtualized cloud environment.

As noted, virtual machines can operate at different power modes (energy levels or states). There is a cost associated with moving a VM from one power mode to another power mode, the cost being a function of the time it takes to do so. In high-end processing, delays can be detrimental. Example VM power modes presented in examples described herein are (i) Off (inactive): In this mode, the VM has not been instantiated; (ii) Idle (or sleep): In the Idle mode, the VM is instantiated but is not running and processing. It may be partially loaded (not given all of the resources that it needs to run); (iii) Powernap mode: This sits between Idle and Active modes. In the powernap mode, the VM has the resources in place but is in a power sleep—able to resume to the Active mode relatively quickly; (iv) Active mode: This is the 'on' mode where the VM is performing processing.

An additional power mode exists referred to as dynamic voltage and frequency scaling (DVFS) mode. In reality, VMs can enter into a DVFS mode in which processor clocking is increased to increase processing speed and therefore the time it takes to complete a task. A task that takes 4 seconds to complete on a server processing at 1 GHz may take only 2 second to complete on a server processing at 2 GHz. It should be noted that DVFS in the VM sense need not necessarily involve adjusting the clock speed of a physical processor supporting the VM, though that is a possibility. Additionally or alternatively, it might include the host system provisioning additional resources (another core for instance) to the VM to effect a dynamic voltage and frequency scaling.

DVFS itself may be 'full' or 'maximum', in which the clocking is increased to the highest (stable) speed, or partial, in which the clocking is increased to a degree less than full. The greater the level of DVFS, the costlier the processing becomes but the sooner it concludes. Thus, there is maximum operating cost with DVFS at any given instant of time, but it may be worthwhile to temporarily scale-up a VM's processing to finish a job sooner, and thereby free resources sooner for additional processing, with a net less-costly effect for processing the workload.

There is a cost of transitioning a VM from one power mode to another power mode. Making a switch from a lower level power mode to a higher level power mode consumes energy. In accordance with aspects described herein, transition costs are considered in the scheduling framework.

Over-provisioning of VMs is a known and sometimes necessary evil, as is under-provisioning (leading to queueing). The scheduling framework can provide an indication of how many VMs there should be, and in which power states, to provide adequate service. Adequate refers to satisfaction of customer expectations of service time, usually provided in a service level agreement (SLA) with the customer. The expectation might be that any requests are serviced within 3 seconds of submission, as an example.

In accordance with aspects of the scheduling framework, determinations are made as to when to place a VM into an active power mode versus when to temporarily place a VM into a DVFS (partial or maximum) power mode. Taking a simple example, there may be one server in the active power mode, and one sever in the Idle power mode. One option is to maintain the Idle server in the Idle mode and enter DVFS (say 4× increase) on the other server. Alternatively, it may be more efficient to bring the Idle server into the active power mode so that both are utilized at active level (or perhaps 2× DVFS each). Energy saved in this framework is given as follows:

Energy saved=Energy saved (idle to inactive)+Energy saved (powernap to idle)+Energy saved (powernap to inactive)+Energy saved (active to powernap)+Energy saved (active to idle)+Energy saved (partial DVFS to active)+Energy saved (DVFS maximum to DVFS partial)+Energy saved (DVFS maximum to active).

Figure 3:
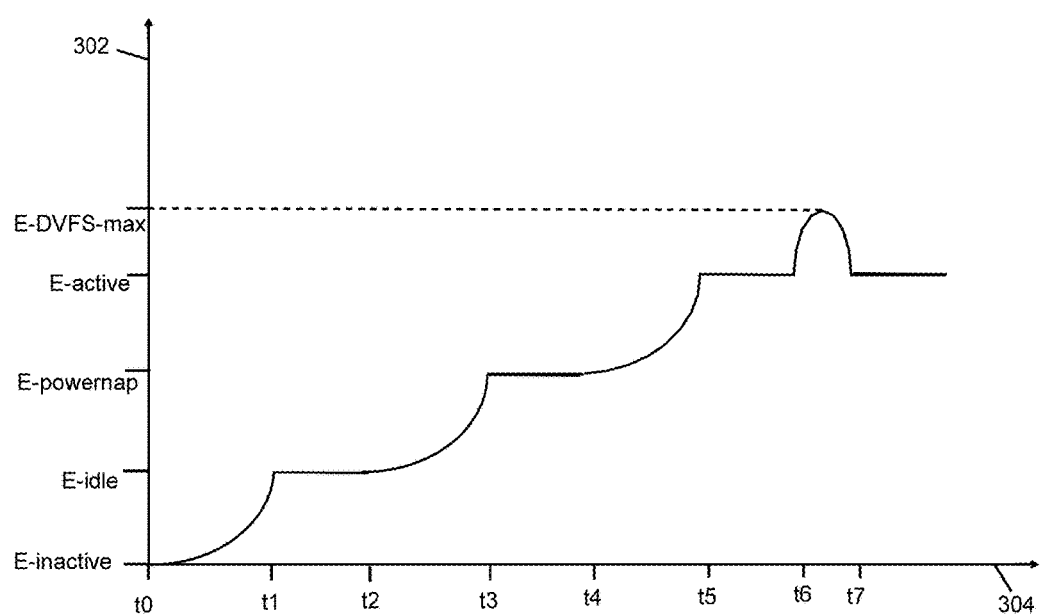
FIG. 3 depicts transitions between different power modes of a virtual machine.

FIG. 3 depicts transitions between different power modes of a virtual machine. In graph 300, the y-axis indicates energy levels/consumption associated with given power modes and the x-axis indicates time. In the E-inactive power mode, zero energy is consumed. The E-idle power mode consumes more energy than the E-inactive mode, and the transition between time t0 and t1 represents the transition energy cost associated with transitioning from the inactive state to the idle state. Similarly, E-powernap consumes more energy than the E-idle mode, and the transition between time t2 and t3 represents the transition energy cost associated with transitioning from the E-idle state to the E-powernap state. The E-active mode consumes more energy than the E-powernap mode, with the transition cost associated with transitioning from E-powernap to E-active being reflected between times t4 and t5.

A gradient of DVFS scaling between E-active and E-DVFS-max provides for different speeds of processing, and therefore different energy usage/cost associated with entering DVFS. Though costly, in terms of energy costs, to perform in DVFS mode, it may be beneficial to enter the DVFS mode if processing something sooner and faster consumes less energy than processing the task slower for a longer amount of time.

A scheduling framework in accordance with aspects described herein seeks to minimize hidden energy cost including transitions from powernap and idle/sleep modes, while utilizing the DVFS energy option, when beneficial to do so, to maximize the energy efficiency of the virtualized environment.

Some approaches to lowering electricity consumption of virtualized environments involve reducing the idle time of servers. This is based on a hypothesis that 60-70% of energy is consumed by idle servers. While these approaches look at the number of instances that are idling, they fail to account for the costs associated with transitions between power modes. Moving from idle to active, for instance, involves a significant transition cost, and a non-negligible amount of energy is lost in switching between modes because it takes time to move between them. The above-noted approaches either ignore this cost or incorrectly assume the transition cost is low. The results are therefore based on an incorrect assumption.

Regarding DVFS, the speed at which a digital circuit can switch states—that is, move from "low" (VSS) to "high" (VDD) or vice versa—is proportional to the voltage differential in that circuit. Reducing the voltage means that circuits switch slower, reducing the maximum frequency at which that circuit can run. This, in turn, reduces the rate at which program instructions that can be issued, which may increase run time for program segments that are sufficiently CPU-bound (i.e. the program instructions hold the CPU service bus). DVFS alone may help energy efficiency in active or idle servers but it does not account for the loss of energy due to switching of servers from different modes, for instance energy loss in switching a server from the powernap mode to the active mode, and vice versa.

Accordingly, aspects described herein provide the scheduling framework used to optimize a number of servers to run for a given load and optimize the power mode in which they run at different times. An allocation policy is provided that can be inscribed in cloud component(s) such as a VMTD (virtual machine turn on/off decider) and/or Tracker of Virtual Machines (TVM), described below, leveraging 'offline' and 'online' models, minimizing the number of servers (VMs), and invoking DVFS when efficient to do so. Regarding the offline and online models, which are described in further detail below, predictions are made about the number of service instances (e.g. workload requests) waiting in the queue. Two approaches are provided herein for predicting that number: (i) calculate it based on current data, or (ii) predict it based on a historic data with an eye on trends. Offline, in this regard, refers to patterns that may be identified from legacy or historical data—past experience. An example is historic data showing that at 5:00 PM each weekday the number of cars traveling the roads increases dramatically (explained by the fact that people leave work to return home around that time). In contrast, the online model suggests a queue length by looking at current data.

Desired performance of the system may be characterized by maximizing throughput and minimizing the energy utilized. Some factors that can impact these metrics are as follows:
  i. Number of active virtual machines
  ii. Transient energy losses
  iii. Alternative modes of operations such as idle, powernap
  iv. Dynamic voltage and frequency scaling Prior approaches do not provide a scheduling framework that takes into account the causality of a combination of these factors. Embodiments of a scheduling framework described herein takes into account a combination of these factors with a bounding condition of increasing the throughput and minimizing the energy utilization of the system.

Some features and aspects of example scheduling frameworks are as follows:
  i. Usage of offline model for predicting the number of virtual machines that will be used for the offered load. As noted above, the offline model is the usage of the historical data. It can indicate for a given time epoch a number of service instances that are probably located in the queue, and therefore a suggested number of VMs to provide, at least initially, in active mode. This is expanded upon in Section 3 below;

ii. Selectively using DVFS to manage the offered load from the stack of virtual machines available in the active mode;

iii. Selective deployment of virtual machines from the powernap, idle, and inactive power modes;

iv. Taking into account the transient energy losses that are incidental when migrating a VM from one power mode to another power mode;

v. Actively reducing the number of virtual machines in the idle and powernap states, thus reducing the overall energy utilization of the system;

vi. Implementable across different server clusters, as threshold values of the system may be calculated and maintained at an initial level. Threshold values here include switching time (time to switch between modes, for instance idle to powernap, powernap to active, active to partial DVFS, and active to full DVFS). Once these are known for a VM, and assuming VMs are homogeneous in terms of the resources to process them, these threshold values can be preloaded;

vii. An implementation reference architecture that embodies the various parts of the scheduling framework thus making it a self-coordinating system;

viii. The system is incentivized to scale the DVFS mode, partial or maximum, until the upper limit of threshold is maintained during the scheduling. The DVFS option is only feasible until the cost of exercising DVFS is lesser than Threshold (which refers to the cost of invoking and servicing new active instances either from inactive, idle or powernap states).

The following are some characteristics of examples described herein:

i. The system assumes a Poisson process of arrival of service instances (i.e. items to be serviced). Such a process would expect that the arrival rates in that process are Poisson distributed;

ii. The M/M/V (Kendall's notation, with V being Virtual Machine, to classify the queue) chain allows us to assume that the holding queue capacity is infinite. A Markov process applied for virtual machines proves this M/MN process and is described below;

iii. Service instances are served eventually on a first-come, first-served basis.

iv. The servers have the ability to invoke the virtual machine instances in power modes that include idle, powernap, and active modes;

v. The servers can implement DVFS partial and full for the VMs;

vi. The service instance interarrival times of the process are exponentially distributed;

vii. The switching/transition energy costs are considered from lower energy state (power mode) to higher energy state (power mode) but not vice versa. It makes sense that moving from a lower power mode to a higher power mode results in a transition cost because a service instance is in the queue waiting to be served. However, when moving from a higher power mode to a lower power mode, there is no such savings in the transition. It does not require resources to move from higher mode to lower mode. While there may be considerable savings in terms of the energy being used once in the target state, there is no savings in the transition itself; and viii. The servers are homogeneous from an energy utilization perspective; each server will utilize the same amount of power to perform a given piece of work.

Figure 4A:
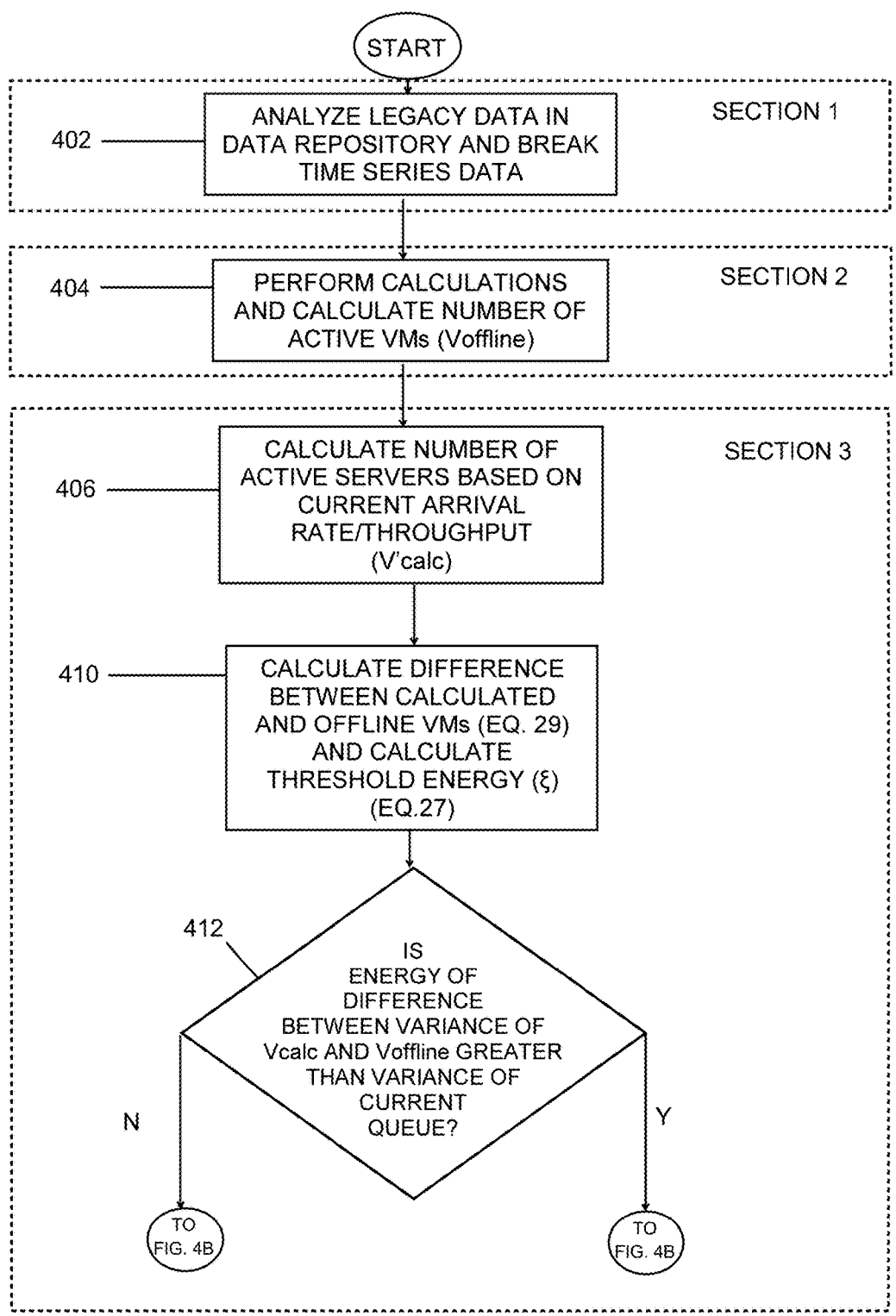
FIGS. 4A and 4B depict an example process for minimizing energy loss in a virtualized environment, in accordance with aspects described herein.
Figure 4B:
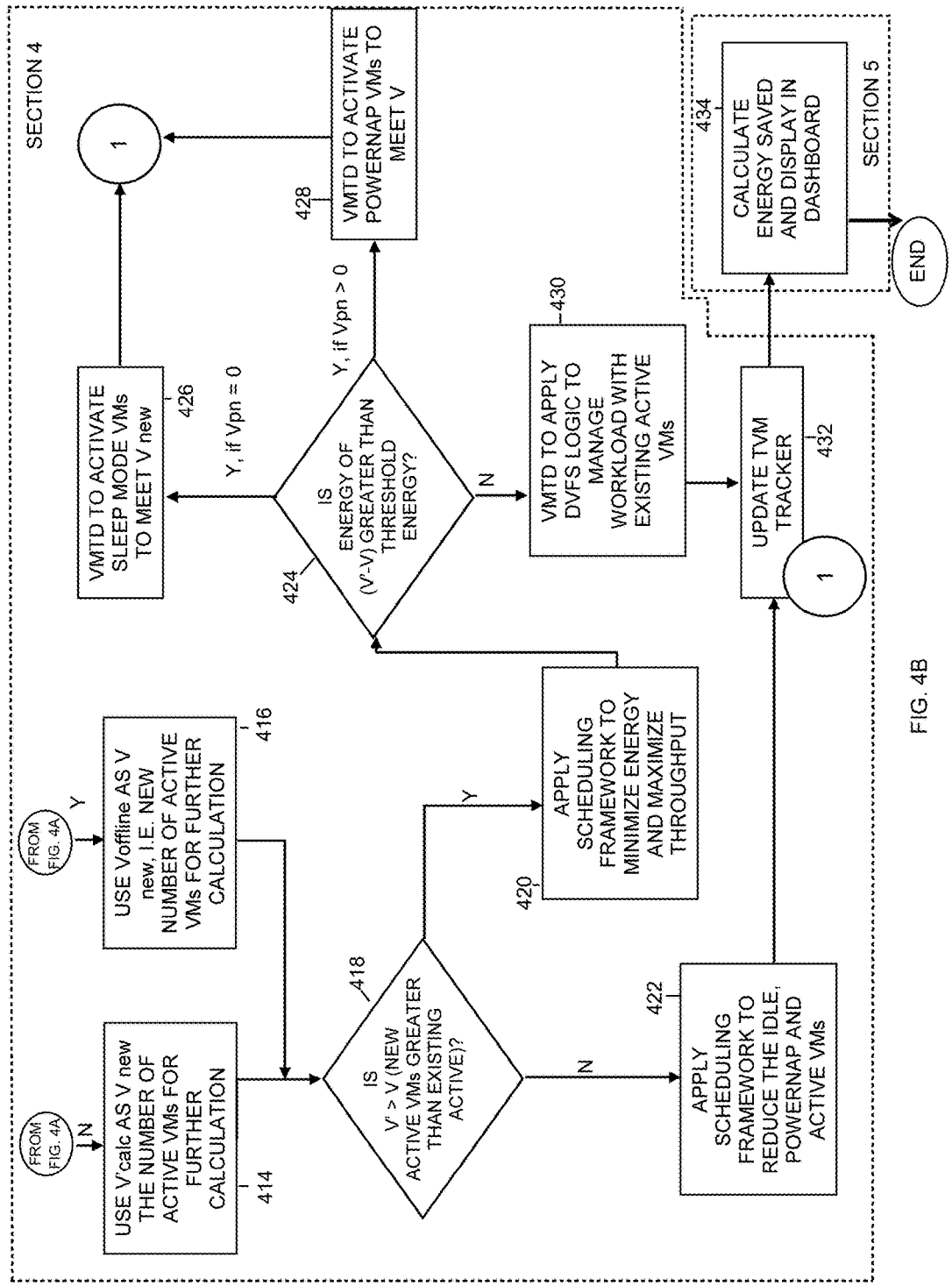

FIGS. 4A and 4B depict an example process for minimizing energy loss in a virtualized environment, in accordance with aspects described herein. Individual portions of the process are described in the following sections:

Section 1— Application of arrival process as Poisson process;

Section 2— Deriving characteristics based on M/M/V model;

Section 3— Deciding between online and offline modeling; and

Section 4— Scheduling framework to minimize energy used and maximize throughput; and Section 5—Energy Savings and Dashboard.

For convenience, a glossary of notations used herein is provided as follows:

Assume that the state of the system can change from $E_k$ to $E_{k-1}$ or $E_{k+1}$. For ease of reference, these will be referred to as 1, 2, . . . V, . . . Z.

$\lambda$ is the arrival rate of the incoming service requests–the rate of passage from $E_k$ to $E_{k+1}$;

T refers to the time epoch for which the system assumes a Poisson arrival process and applies the scheduling framework to manage the offered workload;

n(T) refers to the number of customers that arrive in the system during the time interval T;

A is the mean traffic that is offered during the period T;

$\sigma^2$ is the variation of the offered traffic;

$\mu$ is the service rate (death rate)–The rate of passage from $E_k$ to $E_{k-1}$. Each VM has an independently and similarly-distributed exponential service time distribution with mean of $1/\mu$ (denoted as H, below);

P(i) is the steady-state probability of the system having i service instances;

$\rho$ is the workload rate–the expected number of instances in service;

V is the number of active VMs (VMs in the E-active power mode). Thus, the combined service completion rate is $V\mu$;

N is the mean number of instances in the system;

$N_q$ is the mean number of instances in the queue;

$T_{dw}$ is dwell time, which includes dwell time ($T_q$–the time an instance spends waiting in queue) and service time ($T_{sw}$) the service time. $T_{dw}=T_q+T_{sw}$;

$\alpha$ is the probability that an instance has nonzero delay in queue before receiving service; this would be modeled to function as the QoS;

$\eta$ is traffic intensity, denoting a measure of traffic congestion for V active virtual machines, such as average number of instances assigned to each virtual machine per unit time;

H is average hold time, given as $1/\mu$;

$\xi$ is the steady-state probability of having delays in the system;

V' is the desired (e.g. optimal) number of active VM instances to service an offered workload;

$\Phi$ is the cumulative distribution function;

$\phi$ is the associated probability density function of the standard normal distribution;

$E_v$ (E-active, or $E_{active}$) represent the energy drawn by a VM instance when operating in the active power mode;

$E_i$ (E-idle or $E_{idle}$) represent the energy drawn by a VM instance when operating in the idle power mode;

$E_{pn}$ (E-powernap or $E_{powernap}$) represent the energy drawn by a VM instance when operating in the powernap power mode;

$E_{dvfs}$ (E-dvfs) represent the energy drawn by a VM instance when operating in a dynamic voltage frequency scaling power mode.

$E_{max}$ (Emax or E-max) represent the energy drawn by a VM instance when operating in a dynamic voltage frequency scaling power mode at the maximum or full scalable configuration of the server instance;

$E_\chi$ is the switching energy utilized when migrating from a lower order power mode to a next higher order power mode;

$\epsilon_{threshold}$ represents the minimum energy to activate a new VM from any state other than E-active;

$V'_{calc}$ is the calculated number of the active VM instances to manage the offered workload;

$V_{offline}$, is the number of active VM instances, as determined by the offline algorithm, to manage the offered workload;

Section 1— Application of Arrival Process as Poisson Process:

Referring to FIG. 4A, the process begins with processing described in this Section 1 to analyze legacy data in a data repository and break the time series data (402) into epochs. The time series data stored in the repository might be in a different scale than the time epochs with which the scheduling framework works. The scheduling framework may utilize a 2 second time epoch or a one minute time epoch (as examples) for its decisions about power modes of operation, while the data in the repository might be of a time series of one second, for instance. Breaking the time series data therefore might involve a conversion into data that aligns with the desired time epoch.

The arrival process aims at giving a mathematical description of the way "customers" (service instances) enter the system. A direct characterization is given by the duration between successive arrivals, or else the number of arrivals per time unit: during the interval T, n(T) customers arrive and the arrival rate $\lambda$ is defined as:

$$\lambda = \lim_{T \to \infty} \left(\frac{n(T)}{T}\right)^n \quad \text{(Eq. 1)}$$

Developing the arrival process as a Poisson process:

Assume that the arrival process complies with the following:

the probability of an arrival in an interval [t, t+$\Delta$t] does not depend on what happened before the instant t. This is the so-called memoryless property; and the probability of client arrival is proportional to $\Delta$t, and the probability of more than one event is negligible (in the upper order of the infinitely small, in mathematical language denoted as o($\Delta$t)). The proportionality factor is rated $\lambda$ (process intensity).

These assumptions lead to the Poisson process. With that, the probability of observing k arrivals in an interval of length t, is given by:

$$P_k(t) = \frac{(\lambda t)^k}{k!} e^{-\lambda t} \quad \text{(Eq. 2)}$$

With A representing the mean traffic that is offered during the period considered, this discrete distribution of the Poisson law can be rewritten as:

$$P_k(t) = \frac{A^k}{k!} e^{-A} \quad \text{(Eq. 3)}$$

Average number of arrivals observed in any time interval t being denoted as m:

$$m = \lambda t \quad \text{(Eq. 4)}$$

And its variation is given by:

$$\sigma^2 = \lambda t = m \quad \text{(Eq. 5)}$$

The probability distribution function of the interval between successive arrivals is derived from the distribution: the probability of an interval between arrivals greater than t is the probability that no arrival occurs between 0 and t:

$$A(t) = 1 - e^{-\lambda t} \quad \text{(Eq. 6)}$$

probability density function as:

$$a(t) = \lambda e^{-\lambda t} \quad \text{(Eq. 7)}$$

Thus, the Poisson process interarrival times are exponentially distributed.

Section 2— Deriving Characteristics Based on M/M/V Model:

Referring back to FIG. 4A, the process continues with processing described in this Section 2 to perform calculations and calculate the number of active VMs ($V_{offline}$) (404). An active VM refers to one in the E-active power mode/state. The calculating in Section 2 provides a suggested number of VMs to be in the active state, $V_{offline}$, referring to the offline (legacy data) model above. From historical calculations for a given time epoch, we can determine a number of VMs that should be in active mode, as suggested by the data. If, for instance, a single VM in a time epoch of 1 second can process 2 jobs, then a queue of 6 jobs would suggest a V' (number of active servers) of 3. As noted above, the 'offline' refers to the offline algorithm using historical data calculation.

We apply the queuing model, M/M/V in the Kendal notation, to obtaining measures of power-saving effectiveness for the cloud system, such that there are C total servers in which V virtual machines are desired to be active for processing service instances. The queue discipline is first come, first served (FCFS) and includes a set of states {0, 1, 2, 3, . . . }, denoting, for instance, the number of service instances in the system. State transitions occur with the jumping up or down from the current state.

Figure 5:
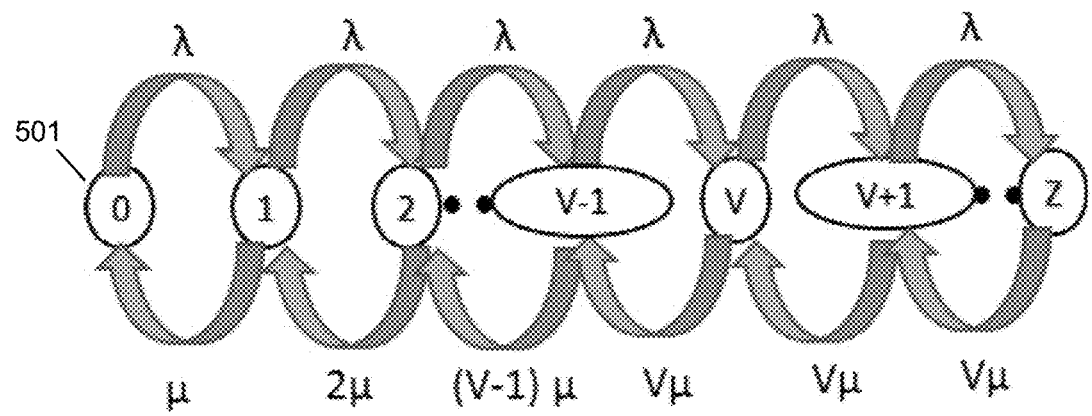
FIG. 5 illustrates different transitions of server states.

FIG. 5 illustrates different transitions of server states. FIG. 5 presents a Markov chain showing states 501 (the middle circles) which are the number of active VMs. An arrival, lambda ($\lambda$) causes a transition to the next higher state (e.g. the first arrival will cause the system to transition from state 0 to state 1). $\mu$ represents service completion rate, and a service completion causes the state to transition to a lower state. Because service rate does not change when extraneous VMs are active (i.e. more than is demanded V+1, . . . , Z), service completion rate does not increase. This explains the cap, V$\mu$, on the service completion rate.

Derive $\rho$ is $\lambda/\mu$ using Little's law:

Little's law provides that the average number of items in a queuing system equals the average rate at which items arrive multiplied by the average time that an item spends in the system. By Little's law, the steady-state mean system sizes to the steady-state average customer waiting times as follows:

$$N = \lambda E(T_{dw}) \quad \text{(Eq. 8)}$$

Therefore, $$N_q = \lambda E(T_q) \tag{Eq. 9}$$

From Eq. 8 and Eq. 9, we get:

$$(N_{dw} - N_q) = \lambda E(T_{dw} - T_q) = \lambda E(T_{sw}) \tag{Eq. 10}$$

As the service distribution is exponential, it has its mean time given by $1/\mu$. Substituting in Eq. 10:

$N_{sw} = (N_{dw} - N_q) \& E(T_{sw}) = 1/\mu$, we get $$N_{sw} = \lambda/\mu \tag{Eq. 11},$$

with $N_{sw}$ referring to the expected number of instances in service in steady state. This is also known as workload rate, denoted by $\rho$.

We can derive $\rho$ is $\lambda/\mu$ from Chapman-Kolmogorov equations to establish the stationarity and discrete property of Markov chain. The average number of instances assigned to each virtual machine per unit time would imply the traffic intensity denoted by $\eta$, and can be obtained as follows:

$$\eta = \rho/V = \lambda/\mu V \tag{Eq. 12}$$

Only if $\eta < 1$, the condition for steady state exists. (Eq. 13)

Intuitively, the offered work should not enter the system faster than the server can process it, in order to guarantee system stability. Therefore, a determination of steady state probability P(i), the steady state probability of having i service instances, is made.

Figure 6:
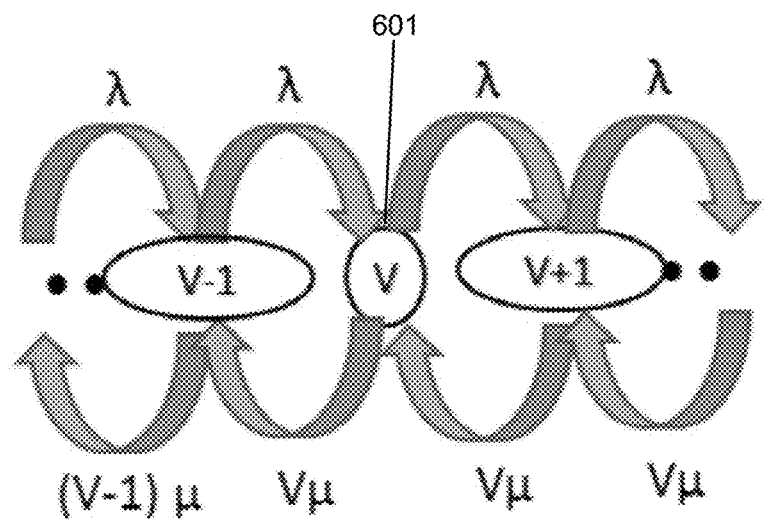
FIG. 6 illustrates a portion of the different server state transitions of FIG. 5.

Referring to FIG. 6, which depicts a portion of the different server state transitions of FIG. 5, we establish that even under the discrete observation and treatment of the Markov chain, the system will reach its steady state (601) and operate at that level per the Erlang concept, which states, in this context, if there are 'V' VMs associated with each of the incoming service requests, a capacity of at least V will be required to process the entirety of the traffic.

Referring to FIG. 6, we can set up the Markov chain as M/M/C type that does not reject any incoming service requests. From Eq. 13, the system is stable and ultimately all requests will be served. This validates the assumption that the queue is of unlimited capacity. The Chapman-Kolmogorov difference-differential equations can be resolved using the Erlang C formulation.

Accordingly, the following is derived:

$$P(i) = \begin{cases} \dfrac{\rho^i}{i!} P(0), & i \leq V \\ \dfrac{\rho^V}{V!} \eta^{i-V} P(0), & i \leq V \end{cases} \tag{Eq. 14}$$

where $$P(0) = \left[ \sum_{k=1}^{V-1} \frac{\rho^i}{k!} + \frac{\rho^V}{v!} \frac{1}{(1-\eta)} \right]^{-1} \tag{Eq. 15}$$

Derive $N_q$ & $T_{dw}$:

The expected queue size can be determined as follows:

$$N_q = \sum_{i=v}^{+\infty} (i-c) P_n = \sum_{k=0}^{+\infty} k P_{i+k}$$

$$N_q = \sum_{k=0}^{+\infty} k \cdot \frac{\rho^V}{V!} \eta^k P_0 = P_0 \frac{\rho^V}{V!} \sum_{k=0}^{+\infty} k \rho^k$$

Substituting for P(0) from Eq. 15 and $\eta$ from Eq. 13:

$$n_q = Pr(>0) \frac{\eta}{1-\eta} = Pr(>0) \frac{\rho}{V-\rho} \tag{Eq. 16}$$

The expected dwell time can be obtained from Little's law ($T_{dw} = N_q/\lambda$):

$$T_{dw} = Pr(>0) \frac{\rho}{V-\rho} \cdot \frac{1}{\lambda} = Pr(>0) \frac{H}{V-\rho} \tag{Eq. 17}$$

Eq. 16 and Eq. 17 provide $N_q$, and $T_{dw}$ used herein.

Section 3— Deciding Between Online and Offline Modeling:

Referring back to the process of FIG. 4A, the process continues with processing described in this Section 3 to decide between the number of VMs suggested by the offline model versus the number suggested by the online ("calculated number of VMs"). In this Section 3, the process calculates (as $V'_{calc}$) a number of active servers based on current arrival rate/throughput (406) (this is the number suggested by the online model), calculates a difference between that number of active servers and the number suggested by the offline model (see Eq. 29 below), as well as a threshold energy $\xi$ (see Eq. 27) (408) and then makes a determination about whether the difference between the variance of $V'_{calc}$ and $V_{offline}$ is greater than the variance of the current queue (410). That determination is used in Section 4— Scheduling framework to minimize energy used and maximize throughput.

Initially, the processing of Section 3 finds steady state probability P(i) of service request/instance delay, which is the steady state probability of having delays in the system. This is denoted as $\xi$.

The probability that an arriving service instance is placed in a queue, that is, the probability that the service instance is delayed, may be determined from the order of the queuing system set up herein, which is first come, first served. Given that for $i \geq V$ we achieve the steady state, the delay probability $\xi$ is shown as:

$$\xi = Pr\{i \geq V\} = \Sigma_{n=V}^{+\infty} P_n = 1 - \Sigma_{n=0}^{V-1} P_n \tag{Eq. 18}$$

$$\xi = 1 - \sum_{n=0}^{V-1} \frac{\rho^n}{n!} P_0 = 1 - \frac{\sum_{n=0}^{V-1} \frac{\rho^n}{n!}}{\left(\sum_{n=0}^{V-1} \frac{\rho^n}{n!} + \frac{\rho^V}{V!(1-\eta)}\right)} \tag{Eq. 19}$$

Solving Eq. 19:

$$\xi = \frac{\frac{\rho^V}{V!(1-\eta)}}{\left(\sum_{n=0}^{V-1} \frac{\rho^n}{n!} + \frac{\rho^V}{V!(1-\eta)}\right)} \tag{Eq. 20}$$

The derived ξ is the probability that an arriving instance has a nonzero wait in the queue. Eq. 20 is also referred to as the Erlang C delay formula. Substituting for the value of $P_0$ in this equation from Eq. 15, we get:

$$\xi = \frac{\rho^V}{V!(1-\eta)} \cdot P_0 \quad \text{(Eq. 21)}$$

The probability that a delay exceeding some given time t, denoted as $\xi_t$, can be calculated:

$$\xi_t = Pr(>t) = Pr(>0)e^{-\left(\frac{V-\rho}{H}t\right)} \quad \text{(Eq. 22)}$$

The parameters μ and α are initialized in advance. Once the monitoring unit detects service instances arrival, it can measure the arrival-rate and transmit the data to a VMTD or TVM, as examples, for calculating V. The unit monitoring the service instances arrival-rate is to check the variation of λ.

Arriving on the optimal V', after the time epoch, the square-root staffing formula can be applied:

$$V' \approx \rho + \beta\sqrt{\rho} \quad \text{(Eq. 23)}$$

where, ρ is the offered load, which would mean the number of busy VMs and β is a parameter reflecting the quality of service.

$$\alpha = \equiv \left[1 + \left(\frac{\beta\Phi(\beta)}{\varphi(\beta)}\right)\right]^{-1}, 0 < \beta < \infty \quad \text{(Eq. 24)}$$

where, Φ is the cumulative distribution function and φ is the associated probability density function of the standard normal distribution.

All else held steady, we can substitute V' as obtained in Eq. 23 and Eq. 16 to obtain:

$$N'_q = Pr(>0)\frac{\rho}{V'-\rho} \quad \text{(Eq. 25)}$$

Given that the α is the probability that an instance will receive delay in its processing, it forms a metric for the performance of the system. It is also possible using Eq. 24 and Eq. 25, to find the desired number of virtual machines for very low α.

If the service provisioning has to be achieved for a 99.999% uptime, we could compute V for

α=0.001%

We get the ideal VM size for such eventuality, denoted as $V_\alpha$ from Eq. 23, as:

$$V_\alpha \approx \rho + \beta\sqrt{\rho} \quad \text{(Eq. 26)}$$

Estimate the function to device cost of switching on a new VM instance versus applying DVFS (partial or full):

Let N=Σ(V, Vi, Vpn), where V is the active number of VM in the system, Vi is VM in the idling state and Vpn is VM in the powernap state within the system. Each VM draws energy correspondingly as Ev, Ei and Epn respectively. When a VM is configured to work in a DVFS mode, it is denoted Vdvfs drawing Edvfs energy. While the DVFS allows a continuous gradient of operation, when it is increased to bring the VM to work at its maximum, it is denoted Vmax drawing Emax energy.

Switching energy is considered from lower energy state to higher energy state, while with not much loss in the variation (and the assumption that the servers are homogenous), we can define the switching energy as $n.E_\chi$, where n is the multiple based on the number of transitions to move to the destination state.

FIG. 7 depicts a table of example switching (transition) energy costs in moving from a power state to another power state, in accordance with aspects described herein. The transition cost of switching from the inactive power mode to the idle power mode is $E_{(\phi,i)}=E_\chi$, for instance. A scalar increase in transition energy costs is reflected in this example (Inactive to Idle to Active is $E_\chi$, $2E_\chi$, and $3E_\chi$), though transition costs between any two consecutive power modes may not be equivalent in other examples, and aspects described herein apply to such situations.

V denotes the active VMs in the system, while V' denotes the calculated VMs as given by Eq. 23. A constant, $\epsilon_{threshold}$, is introduced, which represents the minimum energy to activate a new VM from any state other than E-active, thus:

$$\epsilon_{threshold} = \quad \text{(Eq. 27)}$$
$$\text{Min}(3E_{\chi'}E_i + 2E_{\chi'}E_{pn} + E_X) = \text{Min}(E_i + 2E_{\chi'}E_{pn} + E_X)$$

The exact estimation will depend on the cluster configuration to determine which quantity is lesser between ($E_i + 2E_\chi$) & ($E_{pn}+E_\chi$).

This also ensures that the system has been designed to ensure that each choice is towards minimizing the energy utilization. The residual energy resulted with the transitioning is given in the table of FIG. 8, where minus sign indicates energy savings. Transitioning from E-active to E-idle results in a switching cost and $E_i$, which is cost of idling, i.e. E-idle. Transitioning from E-idle to E-inactive results in a savings of E-idle, the cost of idling the server. Maintaining the system in a given power mode uses just the energy cost of that mode (maintaining the E-idle mode, for instance, use Ew, i.e. E-idle energy). Again in this example, the switching cost of moving between adjacent power modes is the same ($E_\chi$), though this is by example only and not limitation.

Figure 9:
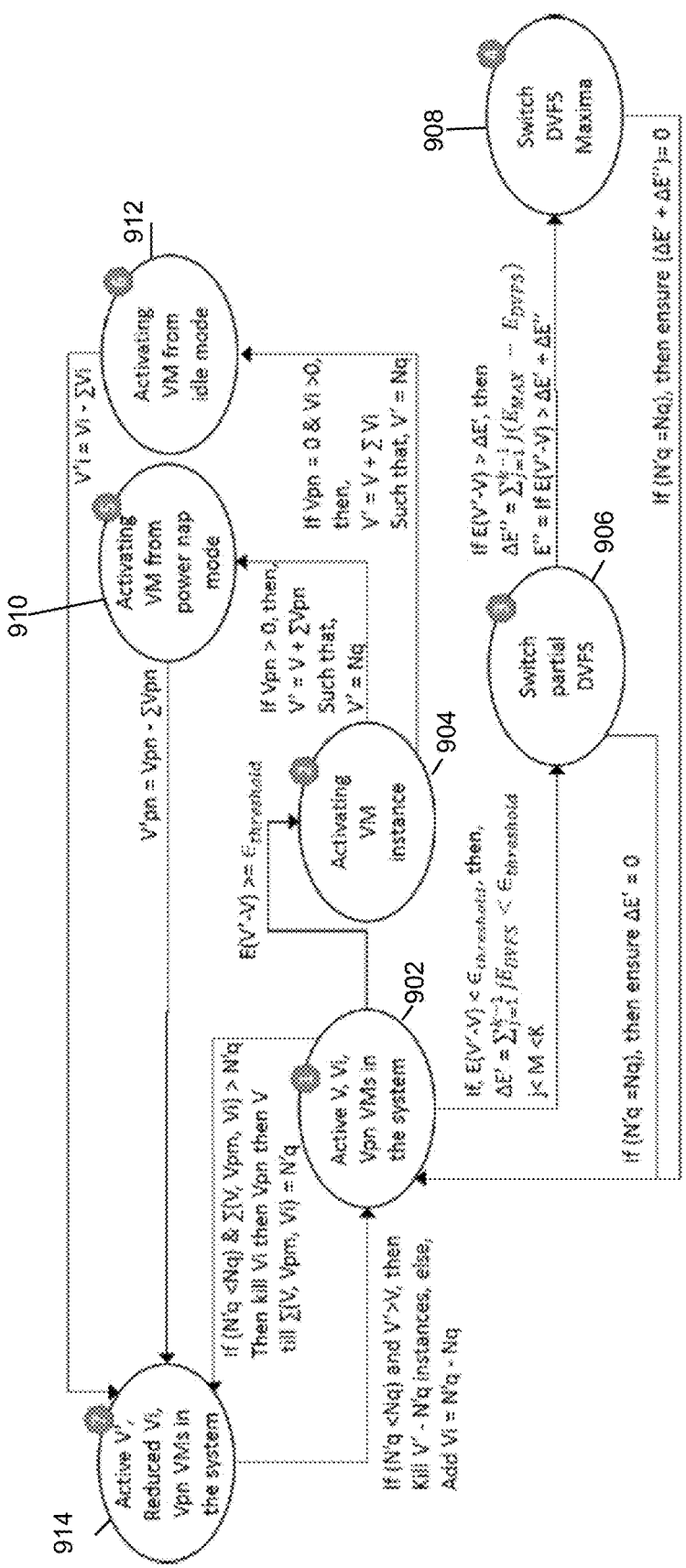
FIG. 9 depicts an example scheduling framework for different virtual machine power modes for virtual machines, in accordance with aspects described herein.

Develop the DVFS and power mode switching logic based on $f(V_{calc}, \xi)$ and switching costs:

FIG. 9 depicts an example scheduling framework for different virtual machine power modes for virtual machines in accordance with aspects described herein. Here the power modes include active (V), idle (Vi), powernap (Vpn), Partial DFVS, and Full/Maximum DVFS. FIG. 9 depicts generally the decisions being made in the framework and how to decide transitioning between scheduling states (902, 904, 906, 908, 910, 912, 914—also labeled 1 through 7 in FIG. 9) of the framework. In this example, to the extent additional VMs not in the active mode are transitioned to E-active for use, the VMs are transitioned in order from highest power mode to lowest power mode (i.e. transition VMs in powernap mode before moving to VMs in idle mode). By way of specific example, assume 5 VMs are in active mode, 10 VMs are in powernap mode, 5 are in idle mode, and 10 are in inactive mode. If 20 services instances are waiting and it is decided to commission additional VMs, the VMs in powernap mode will be exhausted (transitioned to active for processing) before moving on to the 5 idle mode VMs, i.e. transitioning those to active mode. If additional VMs are desired, a decision is made whether to utilize DVFS on one or more active VMs or, instead, commission VMs from the inactive mode to the active mode.

State 1 (902) is conceptually the starting, rest, or home state. Arrows extending from one scheduling state to another scheduling state indicates a switch from the one state to another state, and the arrow indicates the only valid scheduling state transitions available in the framework. Moving from state 2 (904) to state 3 (906) is not possible in this example. The expressions associated with each state transition (arrow) indicate the criteria for deciding to move to the target state. Transitioning from state 1 (902), the options are to either increase capacity by transitioning to state 2 (904) or state 3 (906), or reduce capacity based on less demand, by transitioning to state 7 (914). Transitioning from state 1 (902) to state 7 (914) indicates the 'cleanup', in which, once processing of services instances happen rapidly enough that there is a significant amount of excess capacity (a bad thing from an energy standpoint), VMs in the idle state, powernap state, or active start are moved to inactive (in order from lowest power mode (idle) to highest (active)).

Further details of FIG. 9 are described in Section 4 below.

Estimate the Energy saving function:

From Eq. 22, $\xi_t$, when used for a time epoch t, which is the response time expected by the service request, would be symbolic of a possible default on the QoS expectancy. Thus, at an instance, when $\xi_t > 0$:

$$\xi t = Pr(>t) = Pr(>0)e^{-(\frac{V-\rho}{H}t)} > 0 \qquad \text{(Eq. 27)}$$

This implies that there is an instance or instances in the queue that can lead to default on the QoS related to time t. V' is calculated as follows:

From Eq. 23, $V'_{calc}$:

$$V'_{calc} \approx \rho + \beta\sqrt{\rho} \qquad \text{(Eq. 28)}$$

From the offline module, we get $V_{offline}$, while $V'_{calc}$ represents the expected number of VMs in active state, which depends on offered load $\rho$, arrival rate $\lambda$, and quality of service $\alpha$. If $$\left(\left(\frac{(V'_{calc} - V_{offline})}{V'_{calc}}\right)^2 > \sigma^2\right) \qquad \text{(Eq. 29)}$$

then we accept $V'_{calc}$, else we accept $V_{offline}$.

In Eq. 29, intuitively, if the variation (as a measure of dispersion from mean value) is more with the calculated value received from the offline algorithm ($V_{offline}$) as compared to the variation in the current queue ($\sigma^2$), then the computed offline VM number is rejected and the VM number from the online model is used in the scheduling framework. In other words, if the riskiness associated with the offline model is lesser or equal than the uncertainty/riskiness associated with the determinations done for the current (online) system, then use the offline suggestion. Otherwise, use the online (current data) suggestion.

Section 4— Scheduling Framework to Minimize Energy Used and Maximize Throughput:

Referring to FIG. 4B, the processing continues with processing described in this Section 4 to implement the scheduling/rescheduling framework. From the determination at 410 of FIG. 4A, if the determination is No, then processing continues by using $V'_{calc}$ as $V_{new}$, the number of active VMs for further calculation (414) (i.e. starting point for further framework activity). Alternatively, if the determination at 410 is Yes, then processing continues by using $V_{offline}$ as $V_{new}$, i.e. new number of active VMs for further calculation (416). Processing continues by determining whether V'>V (i.e. is the number of new active VMs greater than the existing number of active VMs) (418). If not, then the process continues by applying the scheduling framework to reduce the number of idle VMs, powernap VMs, and active VMs (in that order) by an appropriate amount (422). Otherwise, if V'>V, then the process continues by applying the scheduling framework to minimize energy and maximize throughput (420), which may involve activating additional VMs, entering DVFS for at least one VM, or managing with the existing power states of the VMs, as examples.

From (420), the process continues by determining whether the energy of (V'–V) is greater than a threshold energy (424). If not, then the virtual machine turn on/off decider (VMTD) applies logic to manage the workload with the existing active VMs (430) (refer to mode I. below). Otherwise, from (424), if energy of (V'–V) is greater than the threshold energy and the number of VMs in powernap is zero, the process continues with the VMTD activating sleep mode VMs (i.e. E-idle mode), to meet Vnew (426). Otherwise, from (424), if energy of (V'–V) is greater than the threshold energy and the number of VMs in powernap is greater than zero, then the process continues with VMTD activating one or more powernap VMs to meet $V_{new}$ (428). In any of the cases where processing continues from (422), (426), (428), or (430), the process continues by updating the TVM tracker (432) accordingly. A calculation of energy saved may be made and displayed on a dashboard or other type of interface for, e.g. users, as is explained in Section 5 below.

Further details of the above processing is now provided with reference to FIG. 9. Initially, processing for the framework may be included as part of a Tracker of Virtual Machines (TVM) and/or a Virtual machine turn on/off decider (VMTD), as examples. In this manner, the scheduling framework may sit in the TVM, which continually indicates the number of VMs to configure in each of the power nodes. In some examples, the TVM is provided at a cloud facility, for instance in a management-layer, that can direct the VMTD (also at the cloud facility) on implementing those power modes on the VMs. Additionally or alternatively, the TVM functionality could be exposed as a service to a customer's VMTD, provided the TVM has access to the relevant historical data for purposes of the offline model calculations.

The role that $\epsilon_{threshold}$ plays is noted, referring to Eq. 27, as the value that will be the threshold for TVM/VMTD (refer to Section 3) to make a decision whether to activate a new VM instance or manage the queue with the existing system. The scheduling framework is described with reference to three modes, explained below:

I. Activate DVFS (partial or maximum) configuration for existing active VM instance(s);

II. Activate new VM instance(s);

III. Reduce VM instances in the idle or powernap mode.

I. Activate DVFS (partial or maximum) configuration for existing active VM instances:

This aspect is encompassed by states 1, 3 and 4 in FIG. 9.

For energy drawn by V'–V being less than the threshold, it provides TVM, which directs VMTD the implementer as to what to perform to reschedule power modes of VMs, an opportunity to manage the queue by exercising a DVFS option, as the energy needed by DVFS is lesser than the energy needed to activate a new instance of a VM. This explains the state path 1-3-1 or 1-3-4-1 (in case of full scale DVFS implementation of all active VMs).

Excess energy used in the path 1-3-1 is given by:

$$\langle \Delta E' = \Sigma_{j=1}^{k-1} j E_{DVFS} | \Delta E' < \epsilon_{threshold} \rangle \quad \text{(Eq. 30)}$$

The system may invoke the DVFS only for the instances until they are lesser than the threshold value.

Excess energy used in the path 1-3-4-1 is given by:

$$\langle \Delta E'' = \Sigma_{j=1}^{k-1} j (E_{max} - E_{DVFS}) | (\Delta E'' + \Delta E') < \epsilon_{threshold} \rangle \quad \text{(Eq. 31)}$$

The maximum mode may be invoked only for those instances that are in DVFS partial mode such that the total energy drawn is lesser than the threshold.

Thus, the system is incentivized to scale the DVFS mode, partial or full/maximum, until the extent that the upper limit of the threshold is maintained during the scheduling.

II. Activate New VM Instances:

This aspect is encompassed by states 1, 2, 5, 6 and 7 in FIG. 9.

Figure 8:
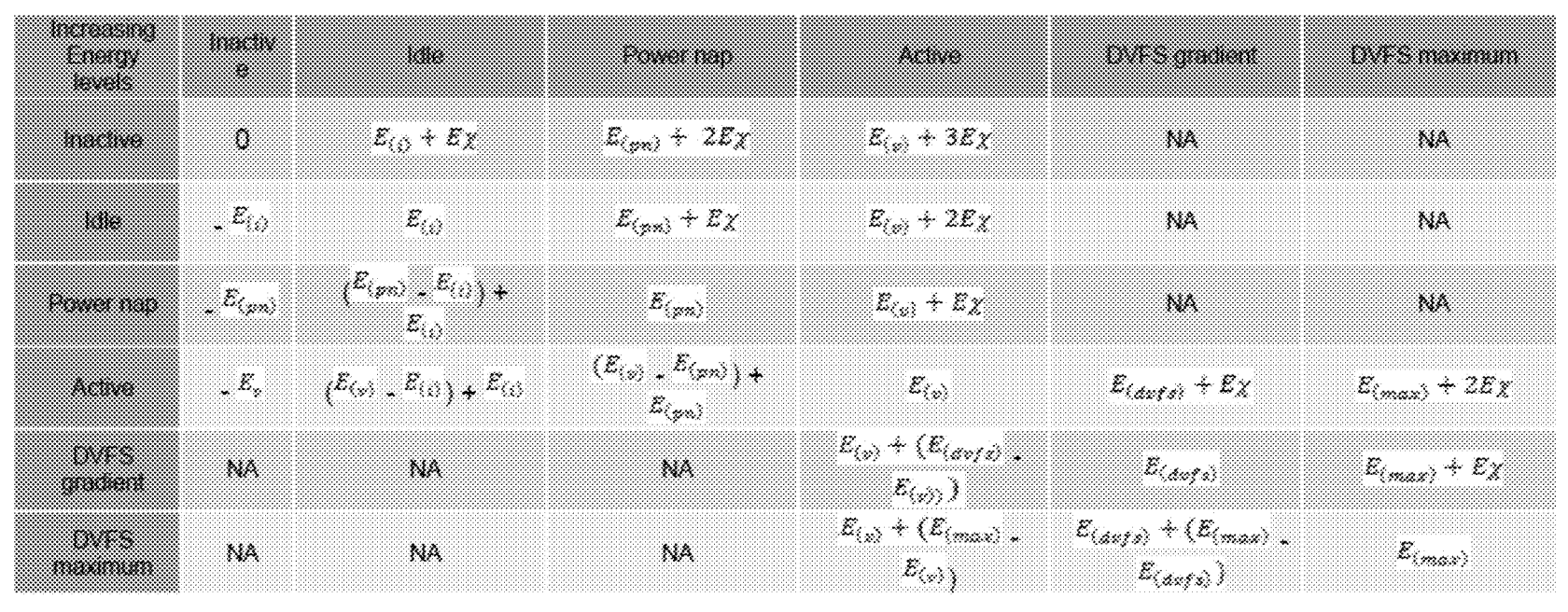

When the energy drawn by V'–V is greater than or equal to the threshold, it makes economic justification to activate a new VM instance from powernap mode (if any instance is available), explaining the choice of the transition path 1-2-5-7-1, otherwise activate a VM from idle state, as in path 1-2-6-7-1. The system returns to the current state 1 (902) after transferring the $V_{idle}$ and/or $V_{pn}$ to V' state. The difference is the cost of transient energy, which is higher in invoking instances from idle state than the powernap state, as indicated by the table of FIG. 8. Thus, switching from idle>switching from powernap≈$(E(v)+2E_\chi)$>$(E(v)+E_\chi$.

Excess energy used in the path 1-2-5-7-1 is given by:

$$\langle \Delta E_{pn}' = \Sigma_{j=k}^{n} j E_{pn} | \Delta E_{pn}' \geq \epsilon_{threshold} | V' = V + \Sigma V_{pn} | V' \leq N_q \rangle \quad \text{(Eq. 32)}$$

Excess energy used in the path 1-2-6-7-1 is given by:

$$\langle \Delta E_i' = \Sigma_{j=k}^{n} j E_i | \Delta E_i' \geq \epsilon_{threshold} | V' = V + \Sigma V_i | V' \leq N_q \rangle \quad \text{(Eq. 33)}$$

III. Reduce VM Instances in the Idle or Powernap Mode.

This aspect is encompassed by states 1 and 7 in FIG. 9.

The framework has been defined to reduce the number of VM instances in idle and powernap mode (in that sequence) as they function more of a fixed cost to provide scalability for the uncertainty during the peak hours. This is achieved by the path 7-1, which is comparing the number of instances in the queue ($N'_q$) against the expected instances and number of total VM instances (N) against the expected queue. This gives the TVM an opportunity to rationalize the VM mix and reduce $V_{idle}$ and then $V_{pn}$ such that the N is aligned to the expected number of instances in the queue.

Section 5—Energy Savings and Dashboard:

The energy saved in the state transition is given as follows:

Energy saved=Energy saved (idle to inactive)+Energy saved (powernap to idle)+Energy saved (powernap to inactive)+Energy saved (active to powernap)+Energy saved (active to idle)+Energy saved (partial DVFS to active)+Energy saved (DVFS maximum to DVFS partial)+Energy saved (DVFS maximum to active).

Thus, from the table of FIG. 8:

Energy saved=$(-E(i))+(E(pn)-E(i))+(-E(pn))+(E(v)-E(pn))+(E(v)-E(i))+(E(dvfs)-E(v))+(E(max)-E(dvfs))+(E(max)-E(v))$.

If any one state transition is substituted as $E_\chi$, we get:

Energy saved=$(E_{(i)} \cdot \Sigma V_{i\ to\ inactive})+(E_{(pn)} \cdot \Sigma V_{pn\ to\ inactive})+(E_\chi \cdot \Sigma V_{v\ to\ pn})+(2E_\chi \cdot \Sigma V_{max\ to\ v})+(E_\chi \cdot \Sigma V_{dvfs\ to\ v})+(E_\chi \cdot \Sigma V_{max\ to\ dvfs})+(2E_\chi \cdot \Sigma V_{max\ to\ v})$ Energy saved=$(E_{(i)} \cdot \Sigma V_{i\ to\ inactive})+(E_{(pn)} \cdot \Sigma V_{pn\ to\ inactive})+E_\chi \cdot [\Sigma V_{pn\ to\ i}+(\Sigma V_{v\ to\ pn})+(2\Sigma V_{v\ to\ i})+(\Sigma V_{dvfs\ to\ v})+(\Sigma V_{max\ to\ dvfs})+(2\Sigma V_{max\ to\ v})]$ (Eq. 34).

Total energy saved by the system is given by Eq. 30, Eq. 31, Eq. 32, Eq. 33 and Eq. 34:

Energy saved=$(E_{(i)} \cdot \Sigma V_{i-inactive})+(E_{(pn)} \cdot \Sigma V_{pn-inactive})+E_\chi \cdot [\Sigma V_{pn-i}+(\Sigma V_{v-pn})+(2\Sigma V_{v-i})]-(\Delta E'_{pn}+\Delta E'_i)+E_\chi [(\Sigma V_{dvfs-v})+(\Sigma V_{max-dvfs})+(2\Sigma V_{max-v})]-(\Delta E'+\Delta E'')$ (Eq. 35).

Figure 10:
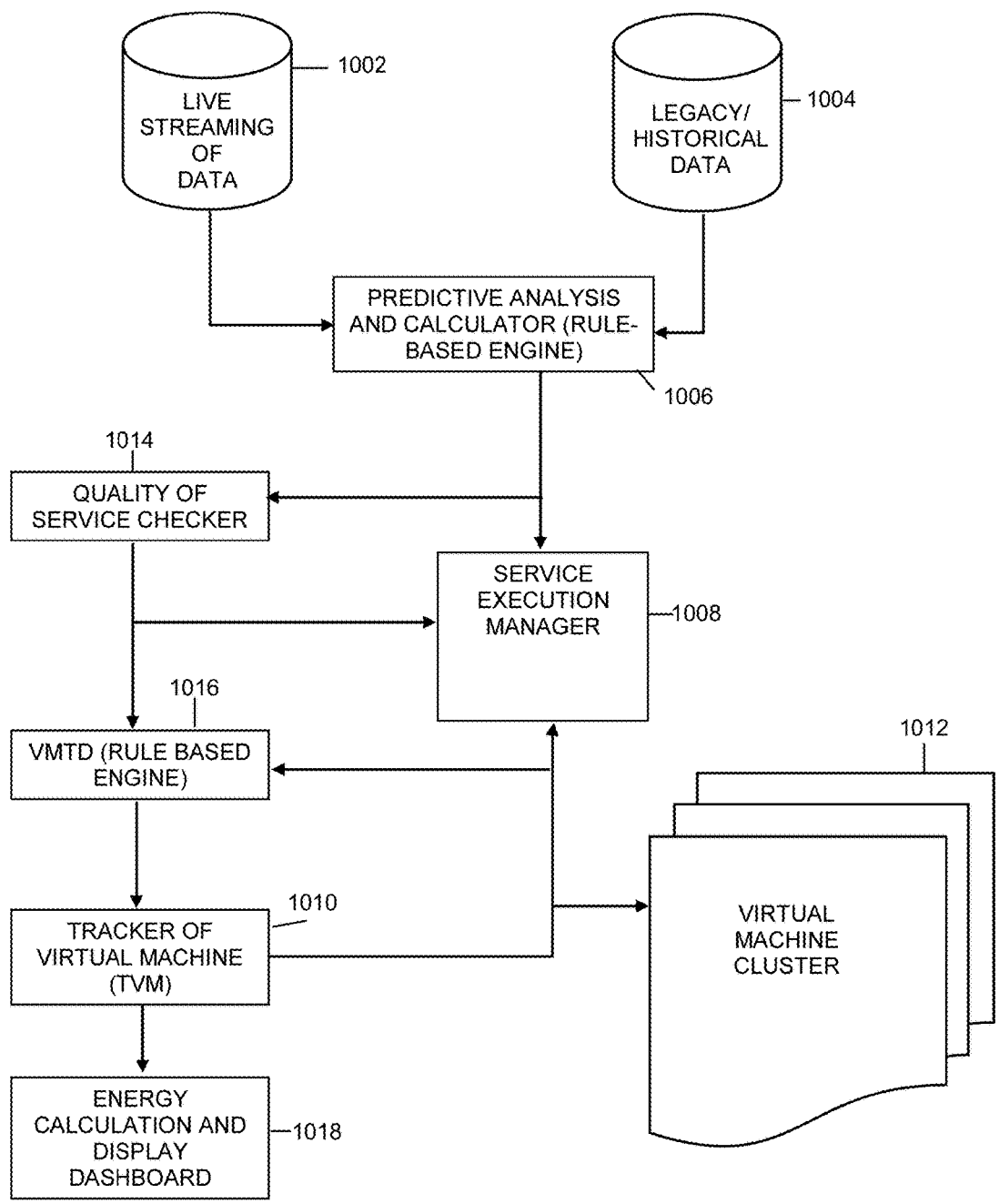
FIG. 10 depicts an example system implementation of aspects described herein.

Energy saved could be displayed on an energy dashboard of FIG. 10. FIG. 10 depicts an example system implementation of aspects described herein. The data used in Section 1 above comes from a component 1002 providing a live (or near live) stream of data, together with a component 1004 providing legacy data used for the offline more. The live streaming of data component 1002 provides the number of requests (service instances) that are coming into the system. A facility may continually reference at a log or other tracker to check how many instances are entering the queueing system. Essentially, the live stream indicates what the queue looks like. The legacy data component 1004 can provide historical data over any desired timeframe, for instance data of the prior one (or more) years.

The predictive analysis and calculator (rule based engine) component 1006 may deploy Apache Hadoop (as an example) for predication of new incoming job arrival time and may work on current data and legacy data and decide whether the offline algorithm or online algorithm will be used for the initial number of VMs to be in the active power mode. The $V_{offline}$ and $V'_{calc}$ values will be considered and 1006 will select the more appropriate to determine the initial number of active VMs to initially configure in the active power mode. Thus, component 1006 is responsible for deriving characteristics of the system using the M/M/V model, and aspects of Section 2 and Section 3 above could be implemented by this component.

It is noted that the $V_{offline}$ can, if desired, be determined periodically in advance (such as at the start of each day) for each upcoming time epoch of that time period (e.g. day). This is because the offline (legacy) data is largely static, and will not change significantly during that time period. In this manner, a table or other data structure can maintain $V_{offline}$ values for each of several upcoming time epochs, and may be cached in component 1006 or another component if desired.

Service Execution Manager (SEM) component 1008 accepts inputs from the TVM 1010 and assigns the job (instance) to an available active node of the virtual machine cluster 112.

Quality of Service Checker (QoSC) component 1014 manages and determines response time to ensure availability and scalability for each application hosted on the VM cluster 1012. It takes input from one or more predefined Service Level Agreements (SLAs) for each domain/application hosted and, accordingly, the response will be sent back to each requester application.

As noted, the Virtual Machine Turn on/off Decider (VMTD) component 1016 is responsible for turning off and on of virtual machines, as well as configuring their power mode dictated by, e.g., TVM. It may be the implementer of decisions made from the scheduling policy framework (Section 4), performed by the TVM 1010, for instance.

The TVM 1010 as discussed above may make the decisions about how many VMs are to be configured in each of the different power modes. By way of specific example, the calculator (component 1006) may indicate an initial number of 10 active VMs based on the suggestion by the offline or the online model. Initially, the TVM may in that case provision 10 active VMs, subject to processing of the scheduling/rescheduling framework detailed in Section 4. The TVM might provision 10 active VMs and decide to maintain two extra in reserve, as a form of initial buffer, for instance. After this, the scheduling framework will dictate whether to provision additional VMs, whether to change power modes of existing provisioned VMs, whether to reduce power mode of any VMs, etc.

The processing involved by component 1006 may repeat for each time epoch, meaning at the beginning of each time epoch a determination between $V'_{calc}$ and $V_{offline}$ is made, and the scheduling framework handles power mode configuration and VM provisioning for the rest of that time epoch. In this manner, there is a loop of activity that repeats for each time epoch. A time epoch can be any desired length of time. In some practical implementations, a time epoch is less than 2 seconds.

Finally, with respect to FIG. 10, the Energy Calculation and Dashboard component 1018 can offer an interface for a user to view information such as information about energy savings. Component 1018 can perform calculations per the equations and details described above in Section 5 and present the results to the user for observation, logging, or any desired purpose.

Figure 11:
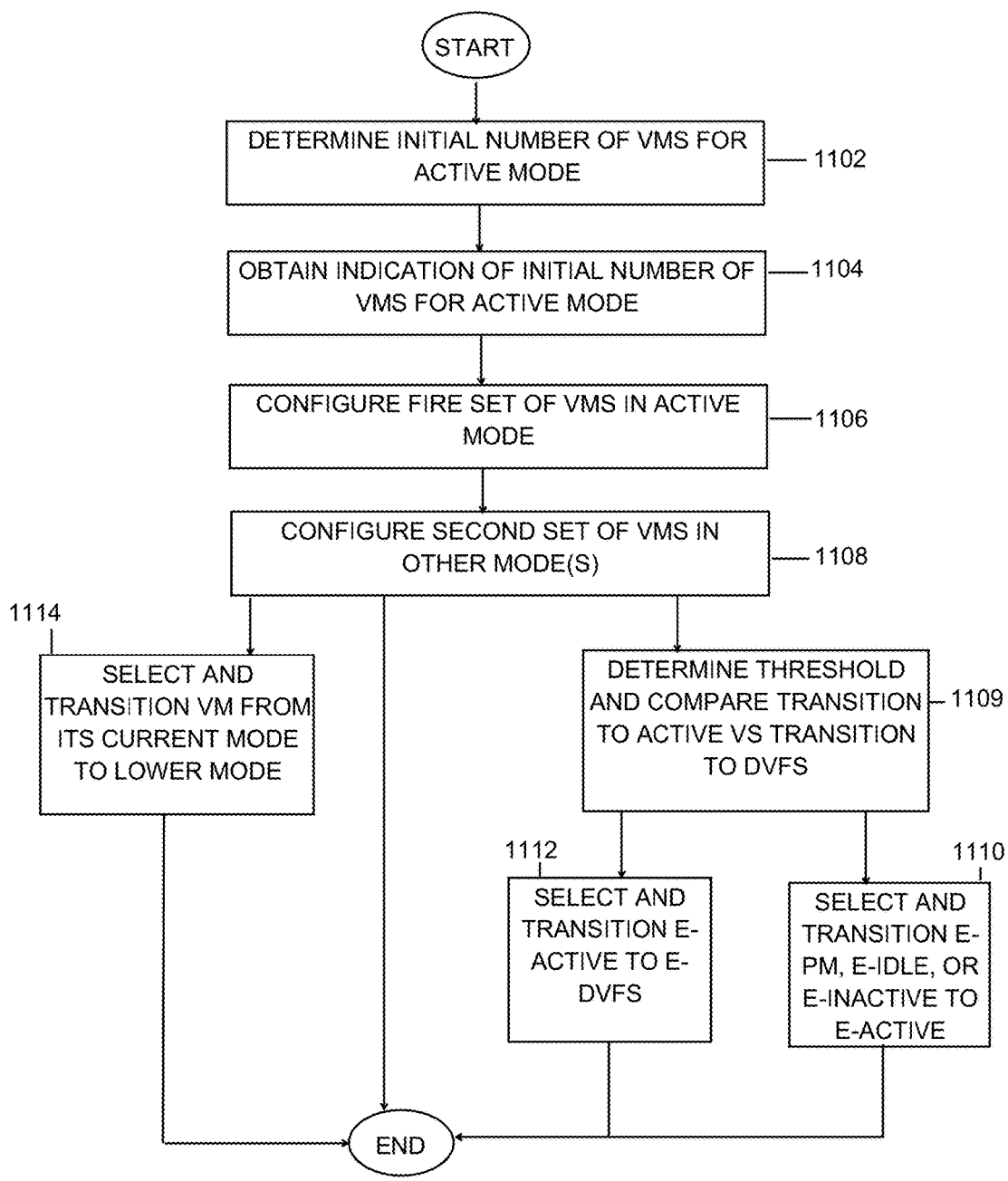
FIG. 11 depicts an example process to facilitate energy savings in handing service instances using a plurality of virtual machines, in accordance with aspects described herein.

Described herein are frameworks and processes to facilitate energy savings in handing service instances using a plurality of virtual machines. An example such process is depicted and described with reference to FIG. 11. The process may be performed by a TVM, VMTD, another component, or a combination of any of the foregoing, where one or more aspects of the process are performed by one of the foregoing and one or more other aspects are performed by another of the foregoing.

The process begins by determining an initial number of virtual machines, of the plurality of virtual machines, to configure in an active power mode to handle service instances (1102). The active power mode is one power mode of a plurality of power modes in which the plurality of virtual machines are available for configuration, and which could include: inactive power mode, idle power mode, powernap power mode, active power mode, and one or more dynamic voltage frequency scaling power modes, as examples. This determination can an online data model using current data and an offline data model using historical data, as explained above, where the determined initial number of virtual machines is determined as between a first number of active virtual machines suggested by the online data model and a second number of active virtual machines suggested by the offline data model. For instance, the online model may suggest the first number of active virtual machines based on a determined service instance queue length based on the current data, a determined probability of a delay in servicing arriving service instances, and a determined offered load and desired quality of service. The offline model may suggest the second number of active virtual machines based on predicted service arrivals based on the historical data, wherein an arrival process for the service instances is modeled as a Poisson process, and a queueing model is used to suggest the second number of active virtual machines.

In some examples, the determined initial number of virtual machines is determined based on whether a difference between a variance of the first number of active virtual machines suggested by the online data model and the second number of active virtual machines suggested by the offline data model is greater than variance of a current queue of service instances.

The process continues by obtaining an indication of that initial number of virtual machines to configure in an active power mode to handle the service instances (1104), configuring a first set of virtual machines, of the plurality of virtual machines, in the active power mode (1106), the first set of virtual machines including the indicated number of virtual machines, and configuring a second set of virtual machines, of the plurality of virtual machines, in one or more other power modes, of the plurality of power modes, lower than the active power mode (1108). As an example, the process configures zero or more VMs in idle mode and zero or more in powernap mode.

The process then enters a phase in which power mode configuration for the first set of virtual machines configured in the active power mode and the second set of virtual machines configured in the one or more other powers modes is managed across a time period and based on service instance arrival. The time period might be a time epoch, for instance.

As part of this, the managing might initiate transition(s) of virtual machine(s) between power modes of the plurality of power modes, taking into account transition energy cost associated with transitioning from a lower power mode of the plurality of power modes to a higher power mode of the plurality of power modes in determining the transition(s).

Thus, in one aspect, additional capability may be needed for handling the queue, in which case a decision is made about whether to provision additional active VMs (1110) or extent an existing active VM to a DVFS mode (1112). Thus, the management may include determining a threshold energy level representing a transition energy cost to transition a virtual machine of the second set of virtual machines from a lower power mode into the active power mode, and comparing the threshold energy level to an alternative energy level associated with maintaining the virtual machines of the second set of virtual machine in their respective other power modes and temporarily transitioning a virtual machine of the first set of virtual machines from the active power mode to a dynamic voltage frequency scaling power mode greater than the active power mode (1109). The dynamic voltage frequency scaling power mode includes possibilities for a partial dynamic voltage frequency scaling power mode or a full dynamic voltage frequency scaling power mode.

Based on the threshold energy level being lower than the alternative energy level, the process selects a virtual machine of the second set of virtual machines to transition into the active power mode and initiates transition of that virtual machine into the active power mode, the selecting being according to an activation priority in which virtual machines are selected for transitioning in order from highest power mode of the other power modes to lowest power mode of the other power modes (1110).

Based on the threshold energy level being higher than the alternative energy level, the process temporarily transitions a virtual machine of the first set of virtual machines from the active power mode to a dynamic voltage frequency scaling power mode greater than the active power mode (1112).

In another aspect, VM resources may be able to be shed in order to save energy cost, in which case it may be determined to transition a virtual machine of the first set of virtual machines or second set of virtual machines from a current power mode of the virtual machine to a lower power mode than the current power mode. The determining could include comparing a number of service instances on a service instance queue to an expected number of service instances on the service instance queue and comparing a total number of virtual server instances to an expected queue, as an example.

If a transition is called for, the process continues by selecting a virtual machine to transition from a current power mode of the virtual machine to a lower power mode than the current power mode (1114), the selecting being according to a priority in which virtual machines are selected for transitioning in order from lower power mode of the plurality of power modes to highest power mode of the plurality of power modes.

After transitioning one or more VMs to a different power mode in response to queue properties (1110, 1112, or 1114), or after determining that no transitions are needed, the process ends.

Alternatively, and in a typical practical implementation, the process (or portions thereof) will iterate. For instance, the time period across which the above-described management takes place may be one time period of a plurality of consecutive time periods. Provision of the power scheduling framework may, in this case, include repeating, for each subsequent time period of the plurality of consecutive time periods: (i) the obtaining the initial number of VMs, (ii) the configuring a first set of virtual machines in the active power mode, (iii) the configuring a second set of virtual machines in one or more other power modes, and (iv) the managing, across the subsequent time period and based on service instance arrival, power mode configuration for the first set of virtual machines configured in the active power mode and the second set of virtual machines configured in the one or more other powers modes, wherein the consecutive time periods are defined by a time epoch of a Poisson process modeling service instance arrivals.

Figure 12:
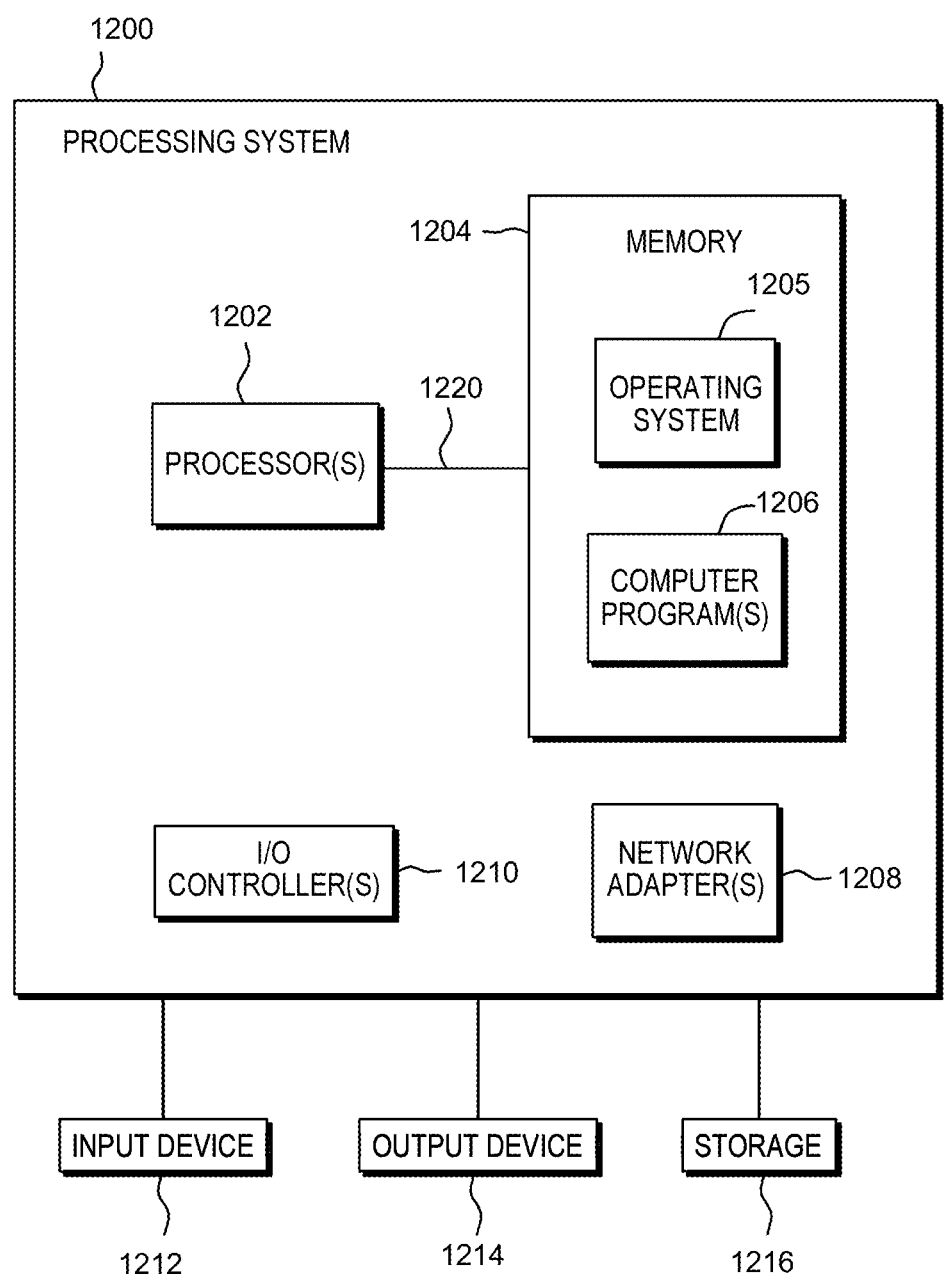
FIG. 12 depicts an example of a computer system to incorporate and use aspects described herein.

Processes described herein may be performed singly or collectively by one or more computer systems. FIG. 12 depicts one example of a computer system to incorporate and use aspects described herein. A computer system may also be referred to herein as a processing device/system or computing device/system, or simply a computer. Computer system 1200 may be based on one or more of various system architectures such as those offered by International Business Machines Corporation (Armonk, N.Y., USA) or Intel Corporation (Santa Clara, Calif., USA), as examples.

Computer system 1200 is suitable for storing and/or executing program code and includes at least one processor 1202 coupled directly or indirectly to memory 1204 through, e.g., a system bus 1220. In operation, processor(s) 1202 obtain from memory 1204 one or more instructions for execution by the processors. Memory 1204 may include local memory employed during actual execution of the program code, bulk storage, and cache memories which provide temporary storage of at least some program code in order to reduce the number of times code must be retrieved from bulk storage during program code execution. A non-limiting list of examples of memory 1204 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 1204 includes an operating system 1205 and one or more computer programs 1206, for instance programs to perform aspects described herein.

Input/Output (I/O) devices 1212, 1214 (including but not limited to displays, microphones, speakers, accelerometers, gyroscopes, magnetometers, light sensors, proximity sensors, GPS devices, cameras, etc.) may be coupled to the system either directly or through I/O controllers 1210.

Network adapters 1208 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 1208 used in computer system.

Computer system 1200 may be coupled to storage 1216 (e.g., a non-volatile storage area, such as magnetic disk drives, optical disk drives, a tape drive, etc.), having one or more databases. Storage 1216 may include an internal storage device or an attached or network accessible storage. Computer programs in storage 1216 may be loaded into memory 1204 and executed by a processor 1202 in a manner known in the art.

The computer system 1200 may include fewer components than illustrated, additional components not illustrated herein, or some combination of the components illustrated and additional components. Computer system 1200 may include any computing device known in the art, such as a mainframe, server, personal computer, workstation, laptop, handheld or mobile computer, tablet, wearable device, telephony device, network appliance, virtualization device, storage controller, etc.

Figure 13:
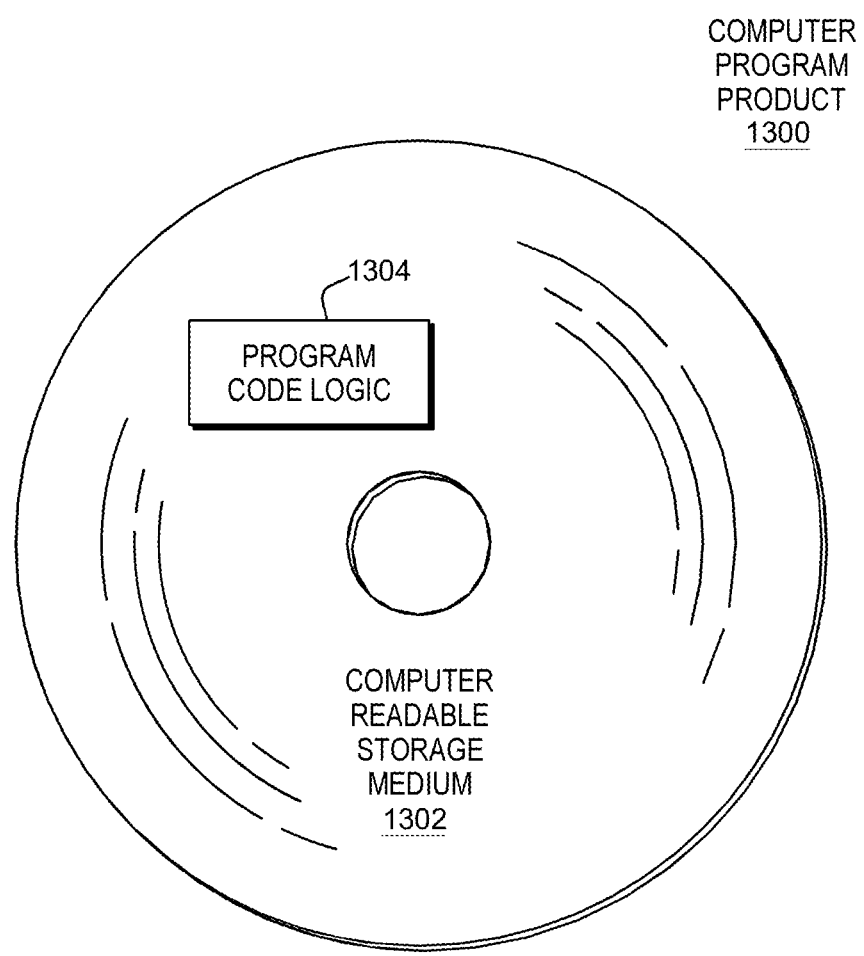
FIG. 13 depicts one embodiment of a computer program product.

Referring to FIG. 13, in one example, a computer program product 1300 includes, for instance, one or more computer readable storage media 1302 to store computer readable program code means, logic and/or instructions 1304 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   providing a power scheduling framework for a plurality of virtual machines to facilitate energy savings in handing service instances, and the providing comprising:
   obtaining an indication of an initial number of virtual machines, of the plurality of virtual machines, to configure in an active power mode to handle the service instances, the active power mode being one power mode of a plurality of power modes in which the plurality of virtual machines are available for configuration;

configuring a first set of virtual machines, of the plurality of virtual machines, in the active power mode, the first set of virtual machines comprising the indicated initial number of virtual machines;

configuring a second set of virtual machines, of the plurality of virtual machines, in one or more other power modes, of the plurality of power modes, lower than the active power mode; and managing, across a time period and based on service instance arrival, power mode configuration for the first set of virtual machines configured in the active power mode and the second set of virtual machines configured in the one or more other powers modes, the managing comprising initiating one or more transitions of at least one virtual machine between power modes of the plurality of power modes, wherein a transition energy cost is associated with transitioning from a lower power mode of the plurality of power modes to a higher power mode of the plurality of power modes and the transition energy cost comprises a cost of energy consumed in a period of transition from the lower power mode to the higher power mode, and wherein the managing accounts for transition energy cost, including the cost of energy consumed in the period of transition from the lower power mode to the higher power mode, in determining the one or more transitions.

2. The method of claim 1, wherein the managing further comprises determining a threshold energy level representing a transition energy cost to transition a virtual machine of the second set of virtual machines from a lower power mode into the active power mode.

3. The method of claim 2, wherein the managing further comprises comparing the threshold energy level to an alternative energy level associated with maintaining the virtual machines of the second set of virtual machines in their respective other power modes and temporarily transitioning a virtual machine of the first set of virtual machines from the active power mode to a dynamic voltage frequency scaling power mode greater than the active power mode.

4. The method of claim 3, wherein based on the threshold energy level being lower than the alternative energy level, the managing further comprises selecting a virtual machine of the second set of virtual machines to transition into the active power mode and initiating a transition of the virtual machine of the second set of virtual machines into the active power mode, the selecting being according to an activation priority in which virtual machines are selected for transitioning in order from highest power mode of the other power modes to lowest power mode of the other power modes.

5. The method of claim 3, wherein based on the threshold energy level being higher than the alternative energy level, the managing further comprises temporarily transitioning a virtual machine of the first set of virtual machines from the active power mode to the dynamic voltage frequency scaling power mode greater than the active power mode.

6. The method of claim 5, wherein the dynamic voltage frequency scaling power mode comprises a partial dynamic voltage frequency scaling power mode or a full dynamic voltage frequency scaling power mode.

7. The method of claim 1, further comprising determining the initial number of virtual machines to configure in the active power mode, wherein the determining the initial number uses an online data model using current data and an offline data model using historical data, and wherein the determined initial number of virtual machines is determined as between a first number of active virtual machines suggested by the online data model and a second number of active virtual machines suggested by the offline data model.

8. The method of claim 7, wherein the online model suggests the first number of active virtual machines based on a determined service instance queue length based on the current data, a determined probability of a delay in servicing arriving service instances, and a determined offered load and desired quality of service.

9. The method of claim 7, wherein the offline model suggests the second number of active virtual machines based on predicted service arrivals based on the historical data, wherein an arrival process for the service instances is modeled as a Poisson process, and a queueing model is used to suggest the second number of active virtual machines.

10. The method of claim 7, wherein the determined initial number of virtual machines is determined based on whether a difference between a variance of the first number of active virtual machines suggested by the online data model and the second number of active virtual machines suggested by the offline data model is greater than variance of a current queue.

11. The method of claim 1, wherein the managing further comprises determining whether to transition a virtual machine of the first set of virtual machines or second set of virtual machines from a current power mode of the virtual machine to a lower power mode than the current power mode.

12. The method of claim 11, wherein the determining comprises comparing a number of service instances on a service instance queue to an expected number of service instances on the service instance queue and comparing a total number of virtual server instances to an expected queue, wherein it is determined to transition a virtual machine from a current power mode of the virtual machine to a lower power mode than the current power mode.

13. The method of claim 12, wherein the managing further comprises selecting a virtual machine to transition from a current power mode of the virtual machine to a lower power mode than the current power mode, the selecting being according to a priority in which virtual machines are selected for transitioning in order from lower power mode of the plurality of power modes to highest power mode of the plurality of power modes.

14. The method of claim 1, wherein the time period comprises a time period of a plurality of consecutive time periods, and wherein the providing the power scheduling framework further comprises repeating, for each subsequent time period of the plurality of consecutive time periods: (i) the obtaining, (ii) the configuring a first set of virtual machines in the active power mode, (iii) the configuring a second set of virtual machines in one or more other power modes, and (iv) the managing, across the subsequent time period and based on service instance arrival, power mode configuration for the first set of virtual machines configured in the active power mode and the second set of virtual machines configured in the one or more other powers modes, wherein the consecutive time periods are defined by a time epoch of a Poisson process modeling service instance arrivals.

15. The method of claim 1, wherein the plurality of power modes comprise: inactive power mode, idle power mode, powernap power mode, active power mode, and one or more dynamic voltage frequency scaling power modes.

16. A computer system comprising:
a memory; and
a processor in communications with the memory, wherein the computer system is configured to perform a method, the method comprising:
providing a power scheduling framework for a plurality of virtual machines to facilitate energy savings in handing service instances, and the providing comprising:
obtaining an indication of an initial number of virtual machines, of the plurality of virtual machines, to configure in an active power mode to handle the service instances, the active power mode being one power mode of a plurality of power modes in which the plurality of virtual machines are available for configuration;
configuring a first set of virtual machines, of the plurality of virtual machines, in the active power mode, the first set of virtual machines comprising the indicated initial number of virtual machines;
configuring a second set of virtual machines, of the plurality of virtual machines, in one or more other power modes, of the plurality of power modes, lower than the active power mode; and
managing, across a time period and based on service instance arrival, power mode configuration for the first set of virtual machines configured in the active power mode and the second set of virtual machines configured in the one or more other powers modes, the managing comprising initiating one or more transitions of at least one virtual machine between power modes of the plurality of power modes, wherein a transition energy cost is associated with transitioning from a lower power mode of the plurality of power modes to a higher power mode of the plurality of power modes and the transition energy cost comprises a cost of energy consumed in a period of transition from the lower power mode to the higher power mode, and wherein the managing accounts for transition energy cost, including the cost of energy consumed in the period of transition from the lower power mode to the higher power mode, in determining the one or more transitions.

17. The computer system of claim 16, wherein the managing further comprises:
determining a threshold energy level representing a transition energy cost to transition a virtual machine of the second set of virtual machines from a lower power mode into the active power mode
comparing the threshold energy level to an alternative energy level associated with maintaining the virtual machines of the second set of virtual machines in their respective other power modes and temporarily transitioning a virtual machine of the first set of virtual machines from the active power mode to a dynamic voltage frequency scaling power mode greater than the active power mode, wherein based on the threshold energy level being lower than the alternative energy level, the managing further comprises selecting a virtual machine of the second set of virtual machines to transition into the active power mode and initiating a transition of the virtual machine of the second set of virtual machines into the active power mode, the selecting being according to an activation priority in which virtual machines are selected for transitioning in order from highest power mode of the other power modes to lowest power mode of the other power modes.

18. The computer system of claim 16, wherein the managing further comprises:
determining a threshold energy level representing a transition energy cost to transition a virtual machine of the second set of virtual machines from a lower power mode into the active power mode
comparing the threshold energy level to an alternative energy level associated with maintaining the virtual machines of the second set of virtual machine in their respective other power modes and temporarily transitioning a virtual machine of the first set of virtual machines from the active power mode to a dynamic voltage frequency scaling power mode greater than the active power mode, wherein based on the threshold energy level being higher than the alternative energy level, the managing further comprises temporarily transitioning a virtual machine of the first set of virtual machines from the active power mode to the dynamic voltage frequency scaling power mode greater than the active power mode.

19. The computer system of claim 16, wherein the method further comprises determining the initial number of virtual machines to configure in the active power mode, wherein the determining the initial number uses an online data model using current data and an offline data model using historical data, and wherein the determined initial number of virtual machines is determined as between a first number of active virtual machines suggested by the online data model and a second number of active virtual machines suggested by the offline data model, wherein the online model suggests the first number of active virtual machines based on a determined service instance queue length based on the current data, a determined probability of a delay in servicing arriving service instances, and a determined offered load and desired quality of service, and wherein the offline model suggests the second number of active virtual machines based on predicted service arrivals based on the historical data, wherein an arrival process for the service instances is modeled as a Poisson process, and a queueing model is used to suggest the second number of active virtual machines.

20. A computer program product comprising:
a computer readable storage medium readable by a processor and storing instructions for execution by the processor for performing a method comprising:
providing a power scheduling framework for a plurality of virtual machines to facilitate energy savings in handing service instances, and the providing comprising:
obtaining an indication of an initial number of virtual machines, of the plurality of virtual machines, to configure in an active power mode to handle the service instances, the active power mode being one power mode of a plurality of power modes in which the plurality of virtual machines are available for configuration;
configuring a first set of virtual machines, of the plurality of virtual machines, in the active power mode, the first set of virtual machines comprising the indicated initial number of virtual machines;
configuring a second set of virtual machines, of the plurality of virtual machines, in one or more other power modes, of the plurality of power modes, lower than the active power mode; and managing, across a time period and based on service instance arrival, power mode configuration for the first set of virtual machines configured in the active power mode and the second set of virtual machines configured in the one or more other powers modes, the managing comprising initiating one or more transitions of at least one virtual machine between power modes of the plurality of power modes, wherein a transition energy cost is associated with transitioning from a lower power mode of the plurality of power modes to a higher power mode of the plurality of power modes and the transition energy cost comprises a cost of energy consumed in a period of transition from the lower power mode to the higher power mode, and wherein the managing accounts for transition energy cost, including the cost of energy consumed in the period of transition from the lower power mode to the higher power mode, in determining the one or more transitions.

* * * * *